US010001381B2

(12) United States Patent
Akaho

(10) Patent No.: US 10,001,381 B2
(45) Date of Patent: Jun. 19, 2018

(54) PRESENTATION PLAN CREATION APPARATUS, INFORMATION PRESENTATION APPARATUS, AND PRESENTATION PLAN CREATION METHOD

(71) Applicant: Mitsubishi Electric Corporation, Chiyoda-ku (JP)

(72) Inventor: Kengo Akaho, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days. days.

(21) Appl. No.: 15/564,741

(22) PCT Filed: Apr. 11, 2016

(86) PCT No.: PCT/JP2016/061651
§ 371 (c)(1),
(2) Date: Oct. 6, 2017

(87) PCT Pub. No.: WO2016/171017
PCT Pub. Date: Oct. 27, 2016

(65) Prior Publication Data

US 2018/0112992 A1 Apr. 26, 2018

(30) Foreign Application Priority Data

Apr. 23, 2015 (JP) ................................ 2015-088114

(51) Int. Cl.
*G08G 1/123* (2006.01)
*G01C 21/36* (2006.01)
(Continued)

(52) U.S. Cl.
CPC .............. *G01C 21/36* (2013.01); *B60K 35/00* (2013.01); *G08G 1/0969* (2013.01); *G09B 29/10* (2013.01); *G01C 21/3492* (2013.01)

(58) Field of Classification Search
CPC .... G01C 21/36; G01C 21/3492; B60K 35/00; G08G 1/0969; G09B 29/10
(Continued)

(56) References Cited

U.S. PATENT DOCUMENTS 9,656,606 B1 * 5/2017 Vose .................. G08G 1/09626
9,902,401 B2 * 2/2018 Stein ..................... B60W 40/06
(Continued)

FOREIGN PATENT DOCUMENTS

JP 10-104014 A 4/1998
JP 2003-322528 A 11/2003
(Continued)

OTHER PUBLICATIONS

International Search Report dated Jun. 28, 2016 in PCT/JP2016/061651, filed on Apr. 11, 2016.

*Primary Examiner* — John A Tweel, Jr.
(74) *Attorney, Agent, or Firm* — Oblon, McClelland, Maier & Neustadt, L.L.P.

(57) ABSTRACT

The present invention aims to create an information presentation plan suitable for characteristics of output devices in view of driver's driving leeway. A presentation plan creation apparatus of the present invention includes: a driving behavior proportion prediction unit that predicts a driving behavior proportion, for each divided path; a device leeway acquisition unit that acquires device leeway data; a presentation item extraction unit that acquires presentation item data; and a presentation plan creation unit that creates a presentation plan in line with a selection condition. The selection condition is that a time of performing, on the selected path, any of the driving behaviors that allows the leeway of the selected device to be equal to or greater than the required leeway required to present the presentation item
(Continued)

is equal to or longer than the required viewing time required to view the presentation item.

13 Claims, 22 Drawing Sheets

(51) Int. Cl.

| | |
|---|---|
| ***G08G 1/0969*** | (2006.01) |
| ***G09B 29/10*** | (2006.01) |
| ***B60K 35/00*** | (2006.01) |
| *G01C 21/34* | (2006.01) |

(58) Field of Classification Search
USPC .................................................... 340/995.13
See application file for complete search history.

(56) References Cited

U.S. PATENT DOCUMENTS

| | | | | |
|---|---|---|---|---|
| 9,919,648 | B1 * | 3/2018 | Pedersen | G08G 1/048 |
| 2014/0300731 | A1 * | 10/2014 | Takemura | B60W 50/06 348/116 |
| 2016/0189444 | A1 * | 6/2016 | Madhok | G07C 5/02 701/36 |

FOREIGN PATENT DOCUMENTS

| | | | |
|---|---|---|---|
| JP | 2007-246024 | A | 9/2007 |
| JP | 2008-015847 | A | 1/2008 |
| JP | 2008-082940 | A | 4/2008 |
| JP | 2008-241309 | A | 10/2008 |
| JP | 2012-216203 | A | 11/2012 |
| JP | 2014-211373 | A | 11/2014 |

* cited by examiner

F I G. 1
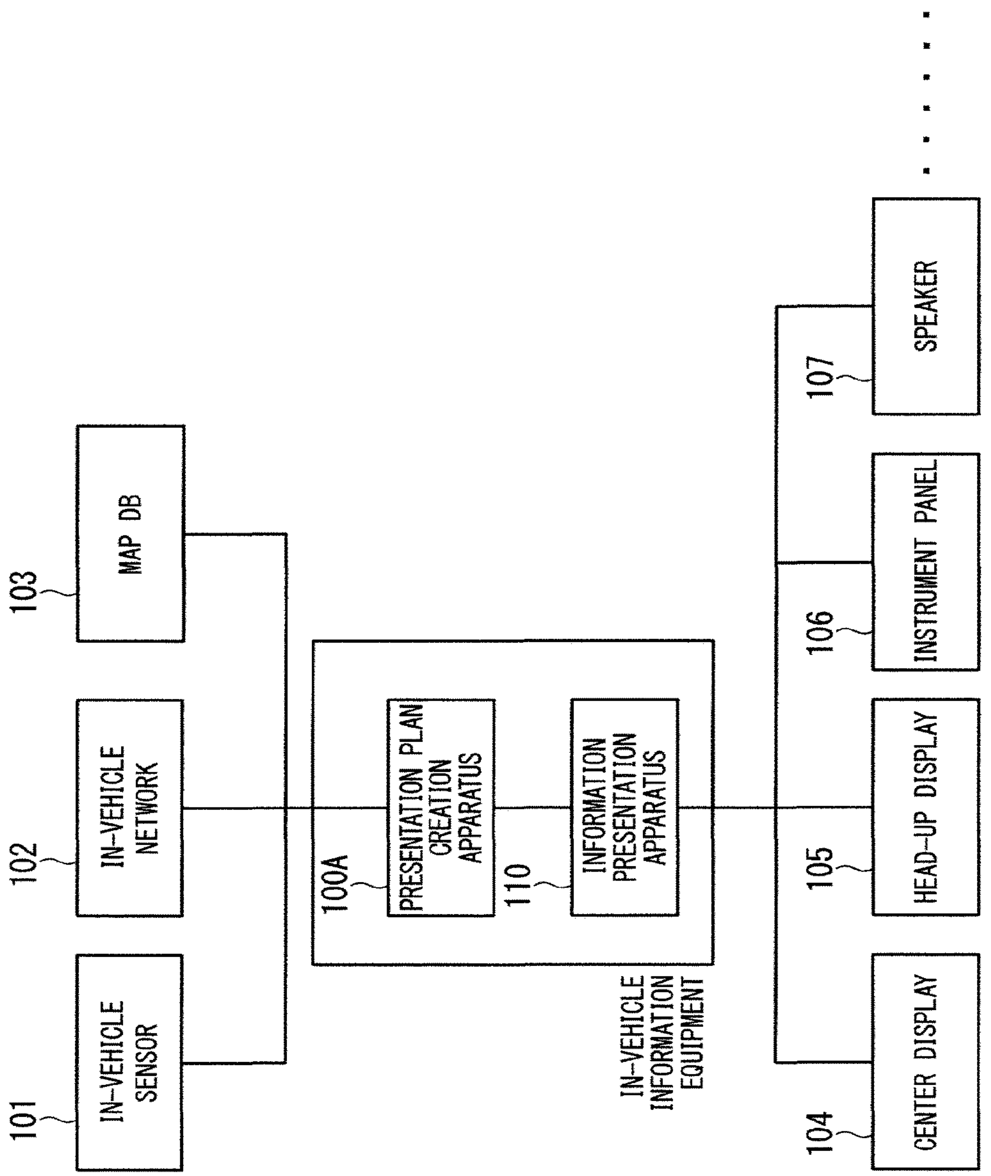

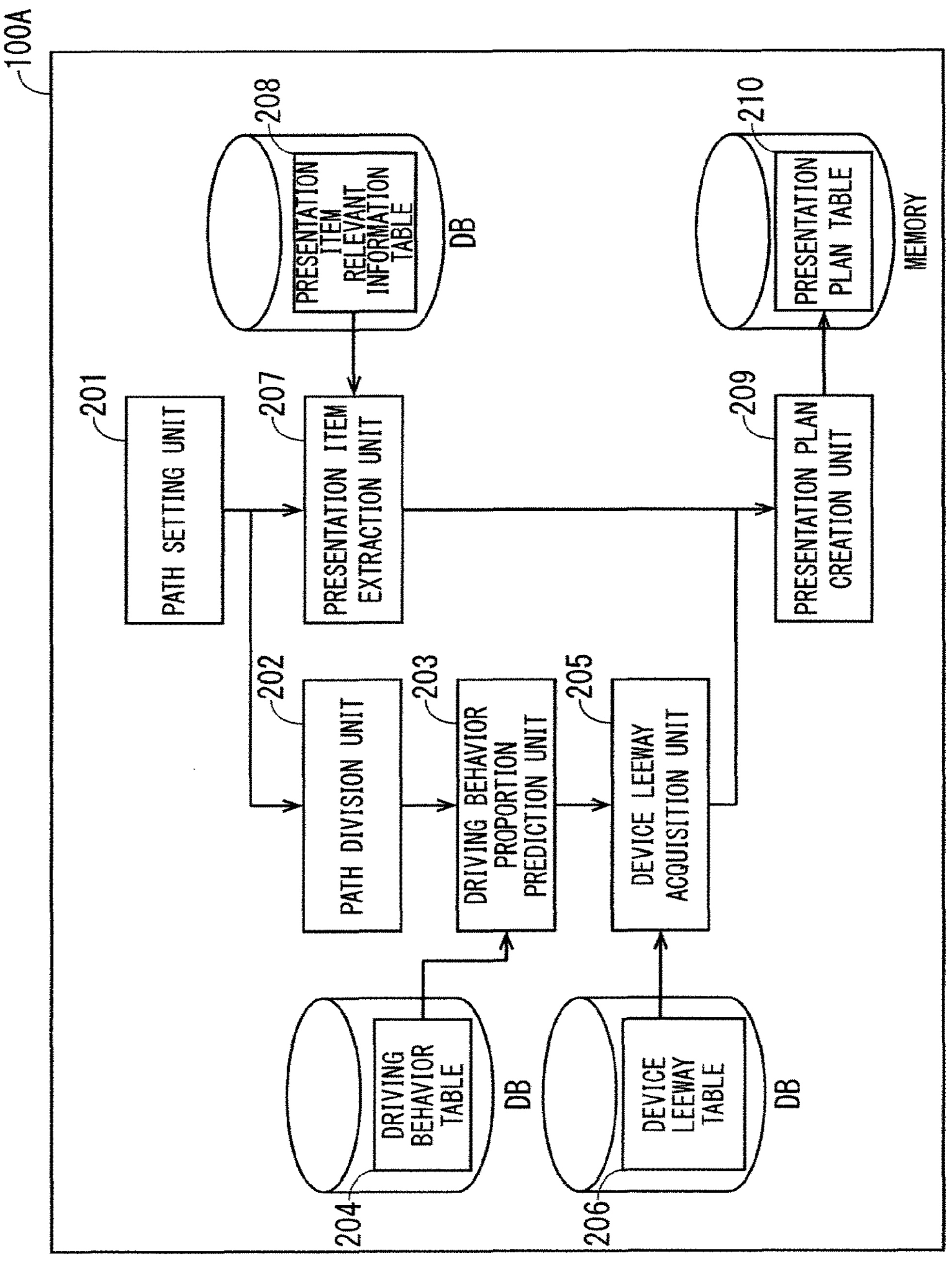
F I G. 2

401

| TRAVELING PATH ROAD TYPE | STOPPING TIME | REDUCED-SPEED DRIVING TIME | STABLE STRAIGHT TRAVELING TIME |
|---|---|---|---|
| HIGHWAY | 10 sec/min | 5 sec/min | 20 sec/min |
| ALLEY | 2 sec/min | 10 sec/min | 5 sec/min |
| EXPRESSWAY | 0 sec/min | 0 sec/min | 50 sec/min |
| MOUNTAIN ROAD | 0 sec/min | 0 sec/min | 0 sec/min |
| ... | ... | ... | ... |

| TRAVELING PATH ROAD TYPE | NUMBER OF STOPPING TIMES | NUMBER OF REDUCED-SPEED DRIVING TIMES | NUMBER OF STABLE STRAIGHT TRAVELING TIMES |
|---|---|---|---|
| HIGHWAY | 0.25 times/min | 0.1 times/min | 0.5 times/min |
| ALLEY | 1 time/min | 2 times/min | 0 times/min |
| EXPRESSWAY | 0 times/min | 0 times/min | 1 time ON ENTIRE DIVIDED PATH |
| MOUNTAIN ROAD | 0 times/min | 0 times/min | 0 times/min |
| ... | ... | ... | ... |

| DEGREE OF TRAFFIC CONGESTION | ADDED STOPPING TIME | ADDED REDUCED-SPEED DRIVING TIME |
|---|---|---|
| NO | 0 min/km | 0 min/km |
| LOW | 0 min/km | 3 min/km |
| MEDIUM | 5 min/km | 5 min/km |
| HIGH | 10 min/km | 5 min/km |

| DEVICE TYPE | LEEWAY DURING STOPPING | LEEWAY DURING REDUCED-SPEED DRIVING | LEEWAY DURING STABLE STRAIGHT TRAVELING |
|---|---|---|---|
| CENTER DISPLAY | 4 | 1 | 1 |
| HEAD-UP DISPLAY | 5 | 2 | 2 |
| SPEAKER | 5 | 3 | 3 |
| INSTRUMENT PANEL | 5 | 2 | 1 |
| ... | ... | ... | ... |

| No. | PRESENTATION ITEM NAME | PRESENTATION ITEM TYPE | LOW DETAIL LEVEL | MEDIUM DETAIL LEVEL | HIGH DETAIL LEVEL |
|---|---|---|---|---|---|
| 1 | TOURIST SITE A | FAMOUS TOURIST SITE INFORMATION | ONLY PHOTO | PHOTO+GENERAL INFORMATION (ADMISSION FEE ETC.) | DETAILED HISTORY |
| 2 | TOURIST SITE B | | | | |
| 3 | TOURIST SITE C | | | | |
| ... | ... | | | | |
| 10 | RESTAURANT A | RESTAURANT | LOCATION +APPEARANCE | SPECIALTY INFORMATION | NUMBER OF SEATS, DEGREE OF CONGESTION |
| 11 | RESTAURANT B | | | | |
| ... | ... | | | | |
| 30 | MAP OF AREA XX | TOURIST SITE MAP | PRESENT MAP (ONLY MAP) | PRESENT MAP (WITH RECOMMENDED ROUTE) | PRESENT MAP (INCLUDING LOCATION INFORMATION) |
| 31 | MAP OF AREA YY | | | | |
| ... | ... | | | | |
| ... | ... | ... | ... | ... | ... |

- PRESENTATION ITEM NAME
- REQUIRED LEEWAY
- PRESENTABLE DEVICE
- REQUIRED VIEWING TIME

| TRAVELING PATH | | STOPPING BEHAVIOR | REDUCED-SPEED DRIVING BEHAVIOR | STABLE STRAIGHT TRAVELING |
|---|---|---|---|---|
| ALL PATHS | PATH 1 | TOTAL OF 300 SECONDS 5 TIMES | TOTAL OF 0 SECONDS 0 TIMES | TOTAL OF 1000 SECONDS 5 TIMES |
| | PATH 2 | TOTAL OF 100 SECONDS 1 TIME | TOTAL OF 100 SECONDS 1 TIME | TOTAL OF 0 SECONDS 0 TIMES |
| | PATH 3 | TOTAL OF 0 SECONDS 0 TIMES | TOTAL OF 0 SECONDS 0 TIMES | TOTAL OF 2000 SECONDS 1 TIME |
| | ... | ... | ... | ... |

| No. | PRESENTATION ITEM NAME | SET DETAIL LEVEL | PRESENTATION ITEM TYPE | LOW DETAIL LEVEL | MEDIUM DETAIL LEVEL | HIGH DETAIL LEVEL |
|---|---|---|---|---|---|---|
| 1 | TOURIST SITE A | HIGH | FAMOUS TOURIST SITE INFORMATION | ONLY PHOTO | PHOTO+GENERAL INFORMATION (ADMISSION FEE ETC.) | DETAILED HISTORY |
| 2 | TOURIST SITE B | HIGH | | | | |
| 3 | TOURIST SITE C | HIGH | | | | |
| ... | ... | ... | | | | |
| 10 | RESTAURANT A | HIGH | RESTAURANT | LOCATION +APPEARANCE | SPECIALTY INFORMATION | NUMBER OF SEATS, DEGREE OF CONGESTION |
| 11 | RESTAURANT B | HIGH | | | | |
| ... | ... | ... | | | | |
| 30 | MAP OF AREA XX | MEDIUM | TOURIST SITE MAP | PRESENT MAP (ONLY MAP) | PRESENT MAP (WITH RECOMMENDED ROUTE) | PRESENT MAP (INCLUDING LOCATION INFORMATION) |
| 31 | MAP OF AREA YY | MEDIUM | | | | |
| ... | ... | ... | | | | |
| ... | ... | ... | ... | ... | ... | ... |

- PRESENTATION ITEM NAME
- REQUIRED LEEWAY
- REQUIRED VIEWING TIME
- PRESENTATION DEVICE

210

| PRESENTATION ITEM No. | SET DETAIL LEVEL | PRESENTATION PATH No. |
|---|---|---|
| 1 | HIGH | 1 |
| 2 | MEDIUM | 2 |
| 3 | HIGH | 2 |
| ... | ... | ... |

F I G. 1 7
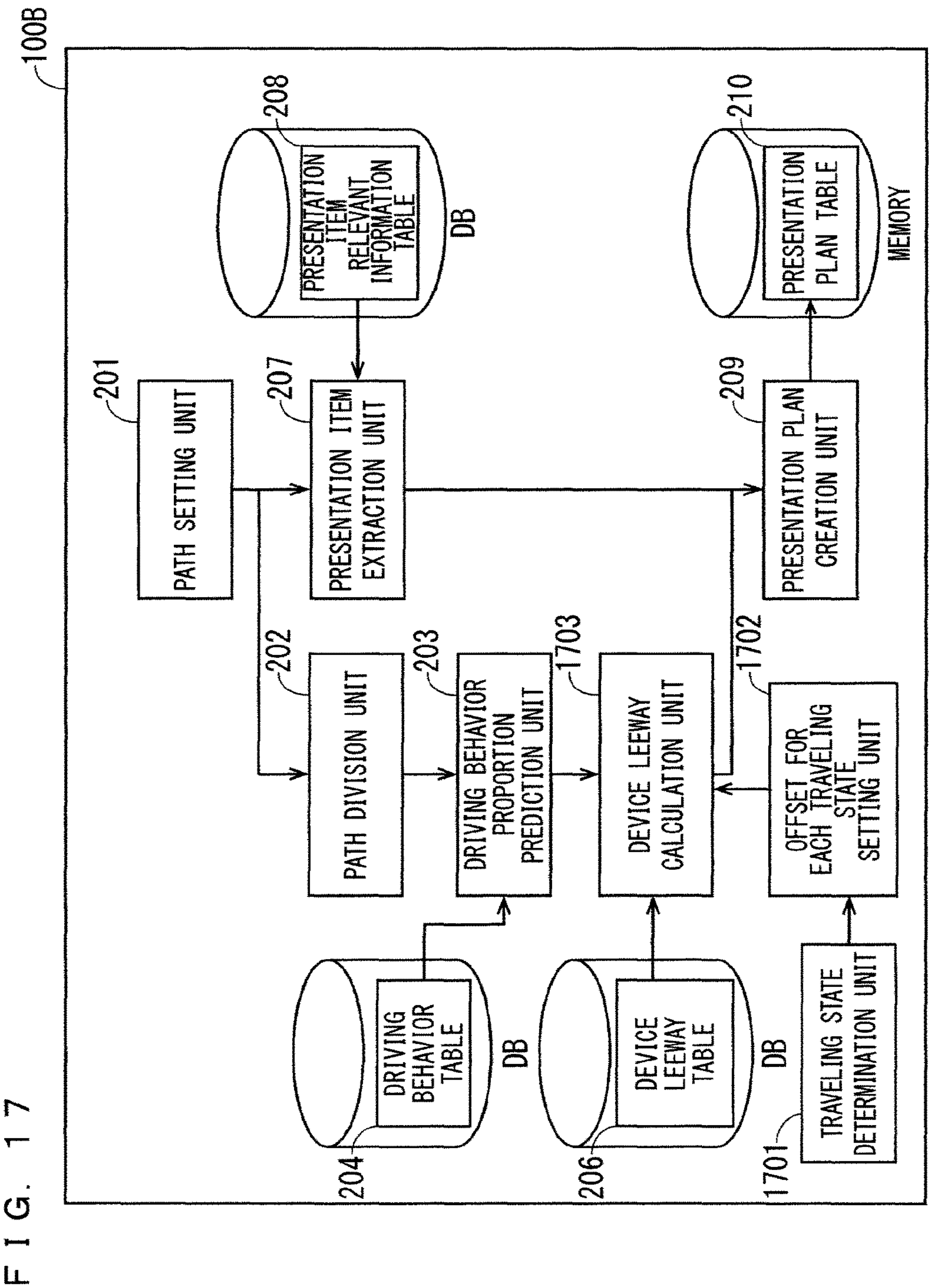

| TRAVELING STATE | CENTER DISPLAY | HEAD-UP DISPLAY | SPEAKER | INSTRUMENT PANEL | … |
|---|---|---|---|---|---|
| ROAD DIFFICULT TO DRIVE ON | −1 | −1 | −1 | −1 | … |
| FATIGUE CONDITION | −1 | −1 | −1 | −1 | … |
| NOISY ENVIRONMENT | 0 | 0 | −1 | 0 | … |
| BACKLIGHTING | 0 | −1 | 0 | 0 | … |
| … | … | … | … | … | … |

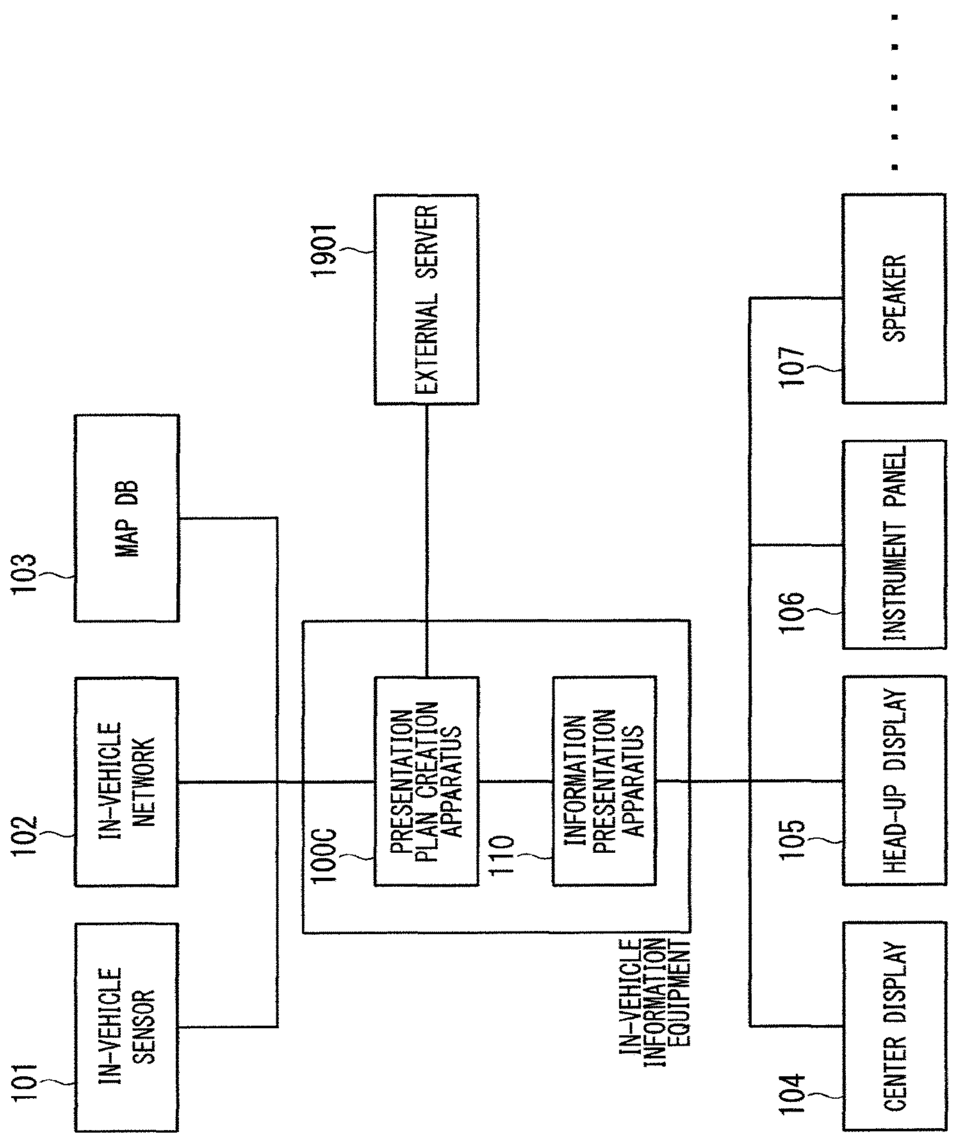
F I G. 1 9

F I G. 2 0
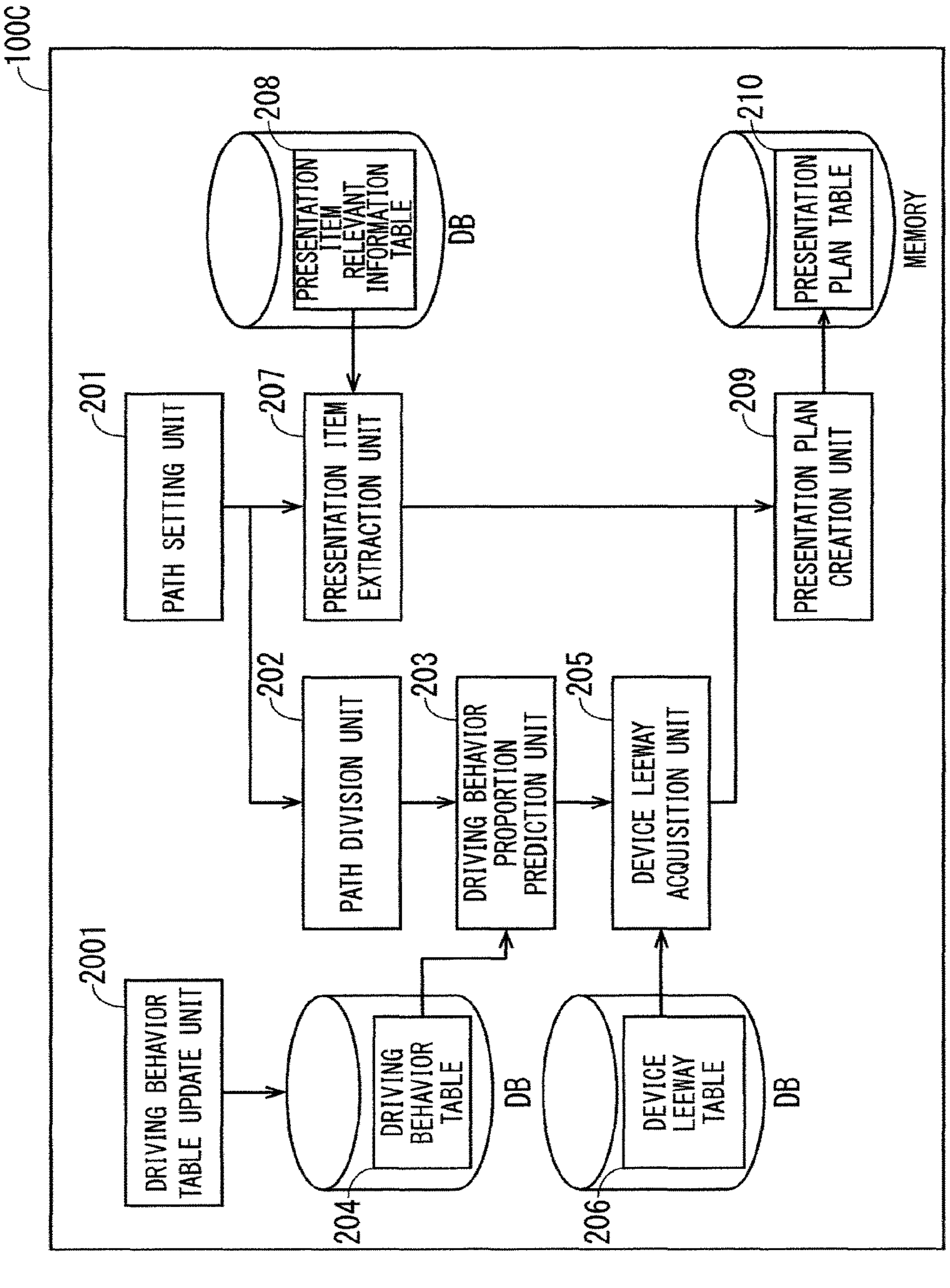

F I G. 2 1
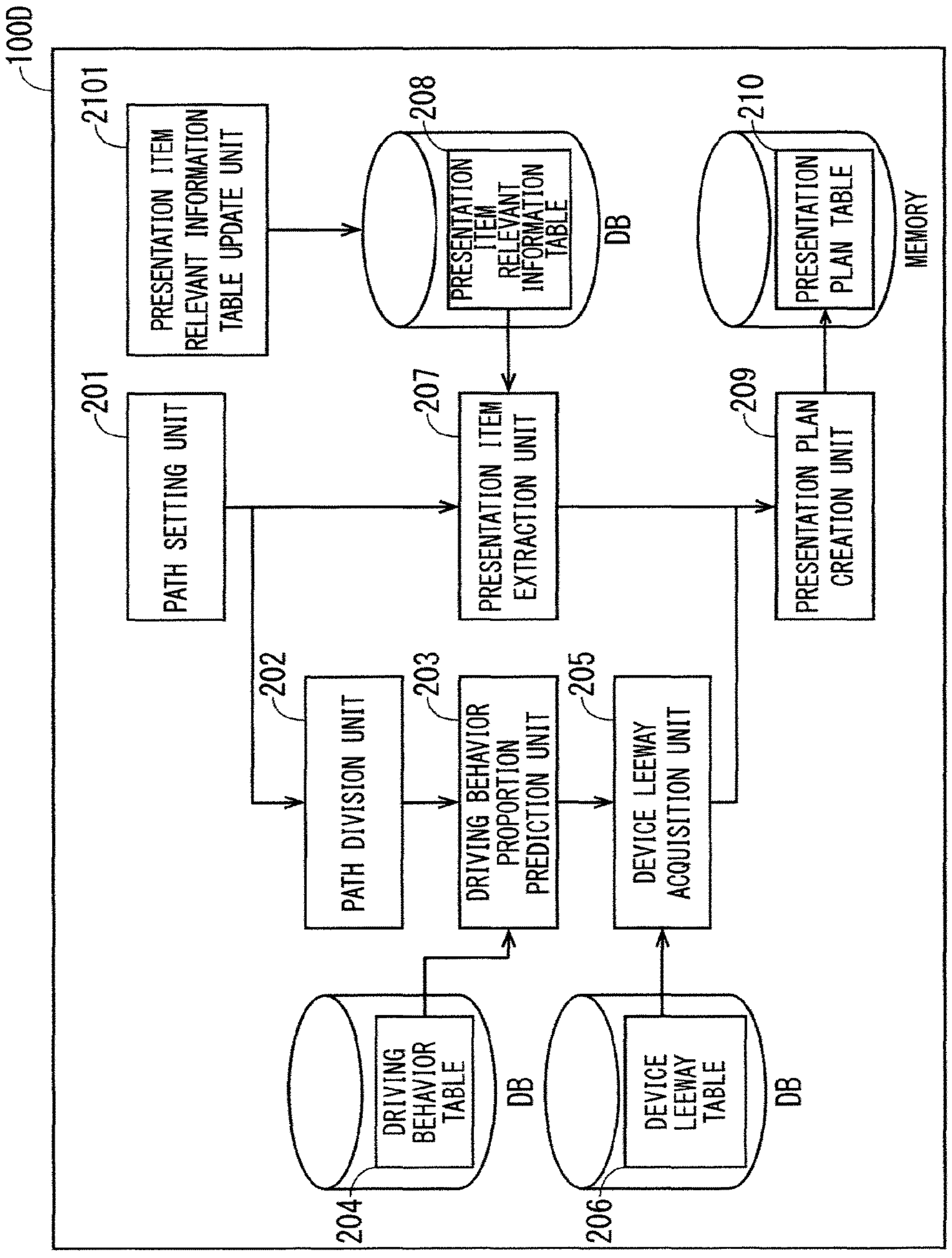

| PRESENTATION ITEM No. | SET DETAIL LEVEL | PRESENTATION PATH NO. | PRESENTED OR NOT PRESENTED |
|---|---|---|---|
| 1 | HIGH | 1 | PRESENTED |
| 2 | MEDIUM | 2 | PRESENTED |
| 3 | HIGH | 2 | NOT PRESENTED |
| ... | ... | ... | ... |

| DEVICE TYPE | LEEWAY DURING STOPPING | LEEWAY DURING REDUCED-SPEED DRIVING | LEEWAY DURING STABLE STRAIGHT TRAVELING |
|---|---|---|---|
| CENTER DISPLAY | 4 | 1 | 1 |
| HEAD-UP DISPLAY | 5 | 2 | 2 |
| INSTRUMENT PANEL | 5 | 2 | 1 |
| ... | ... | ... | ... |

PRESENTATION PLAN CREATION APPARATUS, INFORMATION PRESENTATION APPARATUS, AND PRESENTATION PLAN CREATION METHOD

TECHNICAL FIELD

The present invention relates to creation of a plan for information presentation performed by information equipment installed in a moving object and presentation of information.

BACKGROUND ART

Some types of in-vehicle information equipment typified by a car navigation system and a display audio have a function of presenting information, such as facility information and tourism information. There is technology of controlling the amount of information to be presented in view of driver's driving leeway determined in accordance with a traveling status.

For example, a traffic information system disclosed in Patent Document 1 collects pieces of traveling path information identified for each area of processing, and outputs them to a traffic information data creation apparatus to which processing in the area is allocated with reference to an area allocation table.

A vehicle information provision apparatus disclosed in Patent Document 2 detects a driver's driving tendency and time leeway as driver's characteristics, and provides information to a driver in accordance with the driver's characteristics.

A navigation apparatus disclosed in Patent Document 3 estimates driver's behavior during traveling on a traveling path, and predicts driver's driving leeway based on workload correlation data indicating the correlation between the estimated driver's behavior and a workload (driving leeway). A timing of providing information to be provided to the driver is determined based on the predicted driving leeway.

PRIOR ART DOCUMENTS

Patent Documents

Patent Document 1: Japanese Patent Application Laid-Open Publication No. 2008-15847

Patent Document 2: Japanese Patent Application Laid-Open Publication No. 2007-246024

Patent Document 3: Japanese Patent Application Laid-Open Publication No. 2008-82940

SUMMARY OF INVENTION

Problems to be Solved by Invention

In Patent Documents 1 and 2, an information presentation timing and the amount of information to be presented are determined only using a current state (e.g., a driving load). Thus, a future timing of providing information cannot be determined in advance in a case where a destination and a path are determined by in-vehicle information equipment, such as a car navigation system, and necessary information is provided during traveling to the destination.

On the other hand, in Patent Document 3, the driving leeway is predicted from the driver's behavior, and a timing of providing information to be provided to the driver is determined based on the predicted driving leeway. However, characteristics of various output devices including a center display and a head-up display are not considered, and thus, in a case where a plurality of output devices are used, information suitable for characteristics of respective output devices cannot be presented.

The present invention has been conceived in view of these problems, and aims to provide a display plan creation apparatus that creates an information presentation plan suitable for characteristics of the output devices in view of driver's driving leeway.

Means for Solving Problems

A presentation plan creation apparatus according to the present invention is a presentation plan creation apparatus for creating a presentation plan of a presentation item presented by a plurality of output devices installed in a moving object, the presentation plan creation apparatus including: a path setting unit that sets a path of the moving object to a destination; a path division unit that divides the path into divided paths in accordance with a road type; a driving behavior proportion prediction unit that predicts a driving behavior proportion for each of the divided paths, the driving behavior proportion being a proportion of a total time of performing each of a plurality of driving behaviors in a time of traveling on the divided path; a device leeway acquisition unit that acquires device leeway data indicating, for each of combinations of the output devices and the driving behaviors, leeway representing the amount of information capable of being presented by the output devices; a presentation item acquisition unit that acquires presentation item data indicating required leeway and a required viewing time, the required leeway being the leeway of each of the output devices required to present the presentation item, the required viewing time being a time required to view the presentation item; and a presentation plan creation unit that creates a presentation plan in which a selected device and a selected path are deter mined in line with a selection condition, the selected device being a device to present the presentation item and being selected from the output devices, the selected path being a path on which the moving object travels when the selected device presents the presentation item and being selected from the divided paths, wherein the selection condition is that a time of performing, on the selected path, any of the driving behaviors that allows the leeway of the selected device to be equal to or greater than the required leeway required to present the presentation item is equal to or longer than the required viewing time required to view the presentation item.

A presentation plan creation method according to the present invention is a presentation plan creation method of creating a presentation plan of a presentation item presented by a plurality of output devices installed in a moving object, the presentation plan creation method including: setting a path of the moving object to a destination; dividing the path into divided paths in accordance with a road type; predicting a driving behavior proportion for each of the divided paths, the driving behavior proportion being a proportion of a total time of performing each of a plurality of driving behaviors in a time of traveling on the divided path; acquiring device leeway data indicating, for each of combinations of the output devices and the driving behaviors, leeway representing the amount of information capable of being presented by the output devices; acquiring presentation item data indicating required leeway and a required viewing time, the required leeway being the leeway of each of the output devices required to present the presentation item, the required viewing time being a time required to view the presentation item; and creating a presentation plan in which a selected device and a selected path are determined in line with a selection condition, the selected device being a device to present the presentation item and being selected from the output devices, the selected path being a path on which the moving object travels when the selected device presents the presentation item and being selected from the divided paths, wherein the selection condition is that a time of performing, on the selected path, any of the driving behaviors that allows the leeway of the selected device to be equal to or greater than the required leeway required to present the presentation item is equal to or longer than the required viewing time required to view the presentation item.

A presentation plan creation apparatus according to the present invention is a presentation plan creation apparatus for creating a presentation plan of a presentation item presented by a plurality of output devices installed in a moving object, the presentation plan creation apparatus including: a path setting unit that sets a path of the moving object to a destination; a path division unit that divides the path into divided paths in accordance with a road type; a driving behavior proportion prediction unit that predicts a driving behavior proportion for each of the divided paths, the driving behavior proportion being a proportion of a total time of performing each of a plurality of driving behaviors in a time of traveling on the divided path; a device leeway acquisition unit that acquires device leeway data indicating, for each of combinations of the output devices and the driving behaviors, leeway representing the amount of information capable of being presented by the output devices; a presentation item acquisition unit that acquires presentation item data indicating required leeway and a required viewing time, the required leeway being the leeway of each of the output devices required to present the presentation item, the required viewing time being a time required to view the presentation item; and a presentation plan creation unit that creates a presentation plan in which a selected device and a selected path are deter mined in line with a selection condition, the selected device being a device to present the presentation item and being selected from the output devices, the selected path being a path on which the moving object travels when the selected device presents the presentation item and being selected from the divided paths, wherein the selection condition is that a time of performing, on the selected path, any of the driving behaviors that allows the leeway of the selected device to be equal to or greater than the required leeway required to present the presentation item is equal to or longer than the required viewing time required to view the presentation item. The presentation plan can thereby appropriately be created in view of characteristics of the output devices.

A presentation plan creation method according to the present invention is a presentation plan creation method of creating a presentation plan of a presentation item presented by a plurality of output devices installed in a moving object, the presentation plan creation method including: setting a path of the moving object to a destination; dividing the path into divided paths in accordance with a road type; predicting a driving behavior proportion, for each of the divided paths, the driving behavior proportion being a proportion of a total time of performing each of a plurality of driving behaviors in a time of traveling on the divided path; acquiring device leeway data indicating, for each of combinations of the output devices and the driving behaviors, leeway representing the amount of information capable of being presented by the output devices; acquiring presentation item data indicating required leeway and a required viewing time, the required leeway being the leeway of each of the output devices required to present the presentation item, the required viewing time being a time required to view the presentation item; and creating a presentation plan in which a selected device and a selected path are determined in line with a selection condition, the selected device being a device to present the presentation item and being selected from the output devices, the selected path being a path on which the moving object travels when the selected device presents the presentation item and being selected from the divided paths, wherein the selection condition is that a time of performing, on the selected path, any of the driving behaviors that allows the leeway of the selected device to be equal to or greater than the required leeway required to present the presentation item is equal to or longer than the required viewing time required to view the presentation item. The presentation plan can thereby appropriately be created in view of characteristics of the output devices.

Objects, features, aspects and advantages of the present invention will become more apparent from the following detailed description and the accompanying drawings.

BRIEF DESCRIPTION OF DRAWINGS

FIG. 1 is a block diagram of a presentation plan creation apparatus and peripheral devices in Embodiment 1.

FIG. 2 is a block diagram of the presentation plan creation apparatus in Embodiment 1.

FIG. 7 is a diagram showing the structure of a driving behavior number calculation table in Embodiment 1.

FIG. 8 is a diagram showing the structure of a driving behavior time during traffic congestion calculation table in Embodiment 1.

FIG. 9 is a diagram showing the structure of a device leeway table in Embodiment 1.

FIG. 10 is a diagram showing the structure of a presentation item relevant information table in Embodiment 1.

FIG. 11 is a diagram showing the structure of behavior time for each traveling path prediction results in Embodiment 1.

FIG. 12 is a diagram showing the structure of a presentation device determined version presentation item relevant information table in Embodiment 1.

FIG. 17 is a block diagram of a presentation plan creation apparatus in Embodiment 2.

FIG. 18 is a diagram showing the structure of a leeway offset table in Embodiment 2.

FIG. 19 is a block diagram of a presentation plan creation apparatus and peripheral devices in Embodiment 3.

FIG. 20 is a block diagram of the presentation plan creation apparatus in Embodiment 3.

FIG. 21 is a block diagram of a presentation plan creation apparatus in Embodiment 4.

FIG. 23 is a diagram showing the structure of a presentation plan table in Embodiment 5.

FIG. 25 is a diagram showing the structure of a display device leeway table in Embodiment 6.

DESCRIPTION OF EMBODIMENTS

A. Embodiment 1

<A-1. Configuration and Operation>

Figure 3:
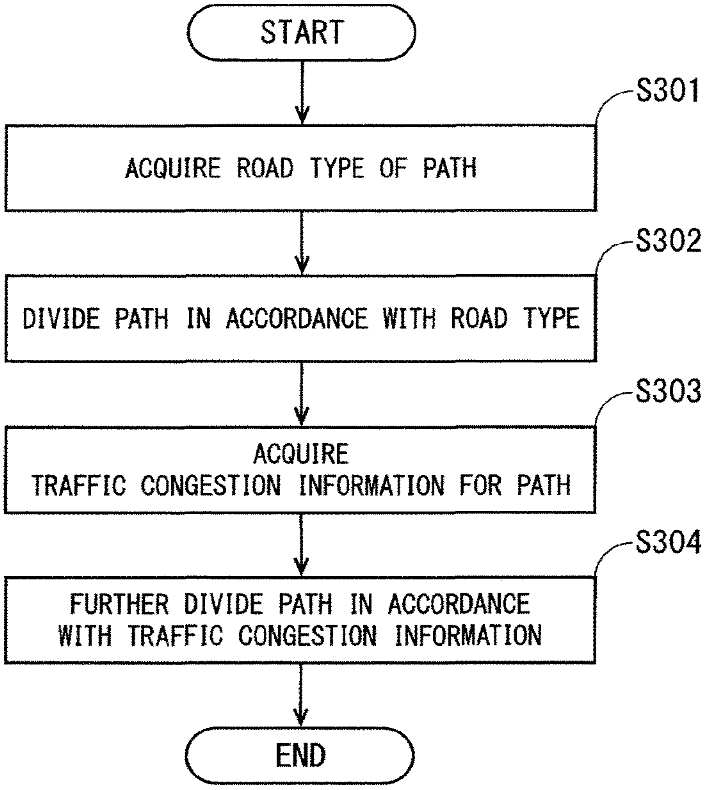
FIG. 3 is a flowchart showing operation of a path division unit in Embodiment 1.

FIG. 1 is a block diagram of a presentation plan creation apparatus 100A and peripheral devices in Embodiment 1.

The presentation plan creation apparatus 100A is provided in in-vehicle information equipment typified by a car navigation system, a head unit, an electronic control unit (ECU), or the like. The presentation plan creation apparatus 100A receives, from an in-vehicle sensor 101 and an in-vehicle network 102 typified by a controller area network (CAN), vehicle information and a user input event using a communication scheme typified by universal serial bus (USB®), Bluetooth®, RS232, and a UART.

The in-vehicle sensor 101 is a sensor installed in a vehicle and typified by a global positioning system (GPS), a gyroscopic sensor, a camera, a millimeter wave sensor, and the like.

The presentation plan creation apparatus 100A receives map information flour a map database (DB) 103 stored in memory of the in-vehicle information equipment or in a server.

Not only the presentation plan creation apparatus 100A but also an information presentation apparatus 110 for presenting presentation items to output devices is installed in the in-vehicle information equipment. The information presentation apparatus 110 is connected to output devices typified by a center display 104, a head-up display 105, an instrument panel 106, a speaker 107, and the like, and transmits presentation items included in a presentation plan created by the presentation plan creation apparatus 100A to the output devices.

FIG. 2 is a block diagram of the presentation plan creation apparatus 100A in Embodiment 1. The presentation plan creation apparatus 100A includes a path setting unit 201, a path division unit 202, a driving behavior proportion prediction unit 203, a driving behavior table 204, a device leeway acquisition unit 205, a device leeway table 206, a presentation item extraction unit 207, a presentation item relevant information table 208, a presentation plan creation unit 209, and a presentation plan table 210.

The path setting unit 201 calculates a destination and a path using map data received from the map DB 103, and transmits information on the calculated destination and path to the path division unit 202 and the presentation item extraction unit 207. The information on the destination and path calculated by the path setting unit 201 is hereinafter simply referred to as "path information". The destination and the path may be calculated using a destination and path calculation system held by the car navigation system and the like. The destination may be input by a user, or may automatically be estimated from a behavior history of the user.

The path division unit 202 divides the path using the path information received from the path setting unit 201. The path information includes road type information on the path and traffic congestion information indicating whether traffic congestion occurs.

FIG. 3 is a flowchart showing operation of the path division unit 202. Referring to FIG. 3 to describe operation of the path division unit 202, the path division unit 202 first acquires a road type of the path (step S301). The road type represents an expressway, a highway, a mountain road, a narrow road, and the like, for example, and can be acquired from the map data.

The path is then divided in accordance with the road type (step S302). In a case where the path is composed of three sections: a narrow road, a highway, and a narrow road, for example, the path is divided into these three sections. The sections obtained by dividing the path are herein referred to as divided paths.

The traffic congestion information is then acquired for each of the divided paths (step S303). The traffic congestion information may be acquired from vehicle information and communication system (VICS®) information or from the Internet.

The path is further divided in accordance with the traffic congestion information (step S304). If traffic congestion is predicted to occur on the highway in the above-mentioned example in which the path is divided into three sections: the narrow road, the highway, and the narrow road, the path is further divided into five sections: the narrow road, a highway (without traffic congestion), a highway (with traffic congestion), a highway (without traffic congestion), and the narrow road. This means that the path to the destination is composed of five divided paths.

The driving behavior proportion prediction unit 203 predicts, for each traveling path divided by the path division unit 202, times and the number of driving behaviors using the driving behavior table 204 in the database. The driving behaviors herein include stopping, reduced-speed driving, stable straight traveling, and the like. The stable straight traveling refers to a state of traveling on a straight road at constant speed without paying a special attention to the surroundings and includes traveling on the expressway, for example.

Figure 4:
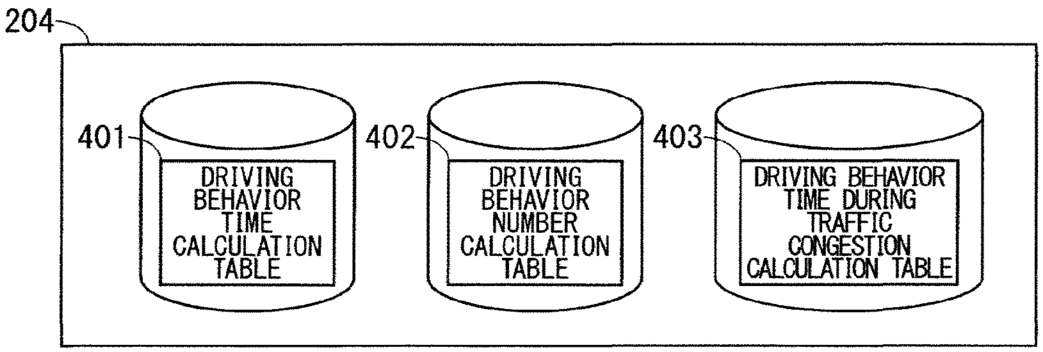
FIG. 4 is a diagram showing the structure of a driving behavior table in Embodiment 1.

FIG. 4 is a diagram showing the structure of the driving behavior table 204 in Embodiment 1. As shown in FIG. 4, the driving behavior table 204 includes three tables: a driving behavior time calculation table 401, a driving behavior number calculation table 402 and a driving behavior time during traffic congestion calculation table 403.

Figures 5, 6:
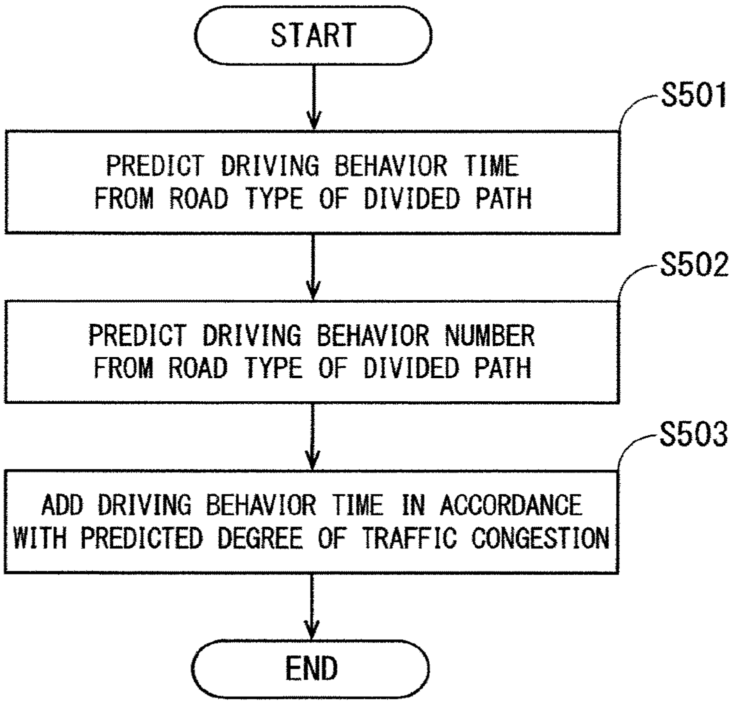
FIG. 5 is a flowchart showing operation of a driving behavior proportion prediction unit in Embodiment 1.
FIG. 6 is a diagram showing the structure of a driving behavior time calculation table in Embodiment 1.

FIG. 5 is a flowchart showing operation of the driving behavior proportion prediction unit 203 in Embodiment 1. Referring to FIG. 5 to describe operation of the driving behavior proportion prediction unit 203, the driving behavior proportion prediction unit 203 first predicts, for each path (divided path) obtained by the path division unit 202, a stopping time, a reduced-speed driving time, and a stable straight traveling time from the road type of the path (step S501). The relationship between the road type and the stopping time, the reduced-speed driving time, and the stable straight traveling time in this processing is defined by the driving behavior time calculation table 401 shown in FIG. 6.

Next, the number of stopping times, the number of reduced-speed driving times, and the number of stable straight traveling times are predicted for each divided path (step S502). The relationship between the road type and the number of stopping times, the number of reduced-speed driving times, and the number of stable straight traveling times in this processing is defined by the driving behavior number calculation table 402 shown in FIG. 7. The driving behavior number calculation table 402 usually indicates the number of driving behaviors per unit time. When the driving behavior on the divided path is constant and hardly changes as on the expressway, however, the number of driving behaviors on the entire traveling path may be indicated in place of the number of driving behaviors per unit time. Values in the driving behavior time calculation table 401 and the driving behavior number calculation table 402 may statically be set, or may be calculated from road information including traffic lights and a road width or with reference to a traveling history of a host vehicle or other vehicles during a similar time period in the past. In a case where the road information is used, for example, the stopping time can be predicted by predicting the number of stop lights from the number of traffic lights and the road width. The stable straight traveling time can also be predicted from the distance between stop lights, a speed limit, and the traffic congestion information.

Next, in a case where traffic congestion occurs on the divided path, a driving behavior time and the number of driving behaviors are added in accordance with a predicted degree of traffic congestion (step S503). The relationship between the degree of traffic congestion and the added driving behavior time in this processing is defined by the driving behavior time during traffic congestion calculation table 403 shown in FIG. 8. The number of stopping times and the number of reduced-speed driving times are both usually increased by one each time traffic congestion occurs, but may be increased by two or more.

The device leeway acquisition unit 205 acquires, with reference to the device leeway table 206 shown in FIG. 9, leeway (device leeway) of each output device for each driving behavior whose proportion is predicted by the driving behavior proportion prediction unit 203. The leeway is herein a parameter representing an upper limit of the amount of information that the output device can present without affecting the driver's safety on each divided path. In other words, the leeway represents the amount of information capable of being presented by the output device. In the present embodiment, the leeway is expressed at five levels from Level 1 to Level 5, and Level 1 indicates a state with the least leeway, whereas Level 5 indicates a state with the most leeway as in a stopping time. The leeway may not be evaluated at five levels, and may be evaluated at ten levels and the like.

FIG. 2 shows that division of the path by the path division unit 202, prediction of the driving behavior proportion by the driving behavior proportion prediction unit 203, and acquisition of the device leeway by the device leeway acquisition unit 205 are performed in this order. Acquisition of the device leeway, however, does not require the results of processing performed by the path division unit 202 or the driving behavior proportion prediction unit 203, and thus may be performed in parallel to the processing performed by the path division unit 202 or the driving behavior proportion prediction unit 203.

The presentation item extraction unit 207 extracts presentation item relevant information (presentation item data) from the presentation item relevant information table 208 stored in the database using output of the path setting unit 201. The presentation item relevant information table 208 is held in the form shown in FIG. 10. In the presentation item relevant information table 208, all the presentation items are managed using presentation item names, and presentation item types are set to the respective presentation item names. Information at a plurality of detail levels is prepared for each of the presentation item types. A cell for each detail level of the presentation item relevant information table 208 has information on a presentation item name, leeway required for presentation (required leeway), an output device that can perform presentation (presentable device), and a required viewing time. The presentation item name is "TOURIST SITE PHOTO", "TOURIST SITE HISTORY", and "CURRENT CONGESTION DEGREE", for example. The required leeway set to three means that any output device having leeway of three or more can perform presentation. The presentable device is "CENTER DISPLAY", "HEAD-UP DISPLAY", and "INSTRUMENT PANEL", for example. In the present invention, an instrument panel having a display function is considered as a display. A plurality of output devices may be set to the presentable device at the same time. The required viewing time is one minute, for example. In an application that presents tourism information around the destination of the vehicle in a case where the destination is set, for example, the presentation item relevant information table 208 includes information relating to tourist sites as shown in FIG. 10. The presentation item extracted from the presentation item relevant information table 208 differs depending on an application, and the presentation item may be extracted in view of preference of a driver or a passenger, a traveling status obtained from the in-vehicle sensor, driving characteristics of the driver and a driving state, and the like.

The presentation plan creation unit 209 creates the presentation plan table 210 using the presentation item extracted by the presentation item extraction unit 207, behavior time for each traveling path prediction results 1101 of the driving behavior proportion prediction unit 203, and the device leeway table 206 acquired by the device leeway acquisition unit 205. FIG. 11 shows the behavior time for each traveling path prediction results 1101 of the driving behavior proportion prediction unit 203. The presentation plan creation unit 209 adds information on an output device to perform presentation to the presentation item relevant information (presentation item data) extracted by the presentation item extraction unit 207 to create a presentation device determined version presentation item relevant information table 1201. FIG. 12 shows the presentation device determined version presentation item relevant information table 1201. This processing is referred to as presentation device determination processing. The presentation plan creation unit 209 creates the presentation plan table 210 using the presentation device determined version presentation item relevant information table 1201, the behavior time for each traveling path prediction results 1101, and the device leeway table 206. This processing is referred to as presentation plan creation processing.

Figure 13:
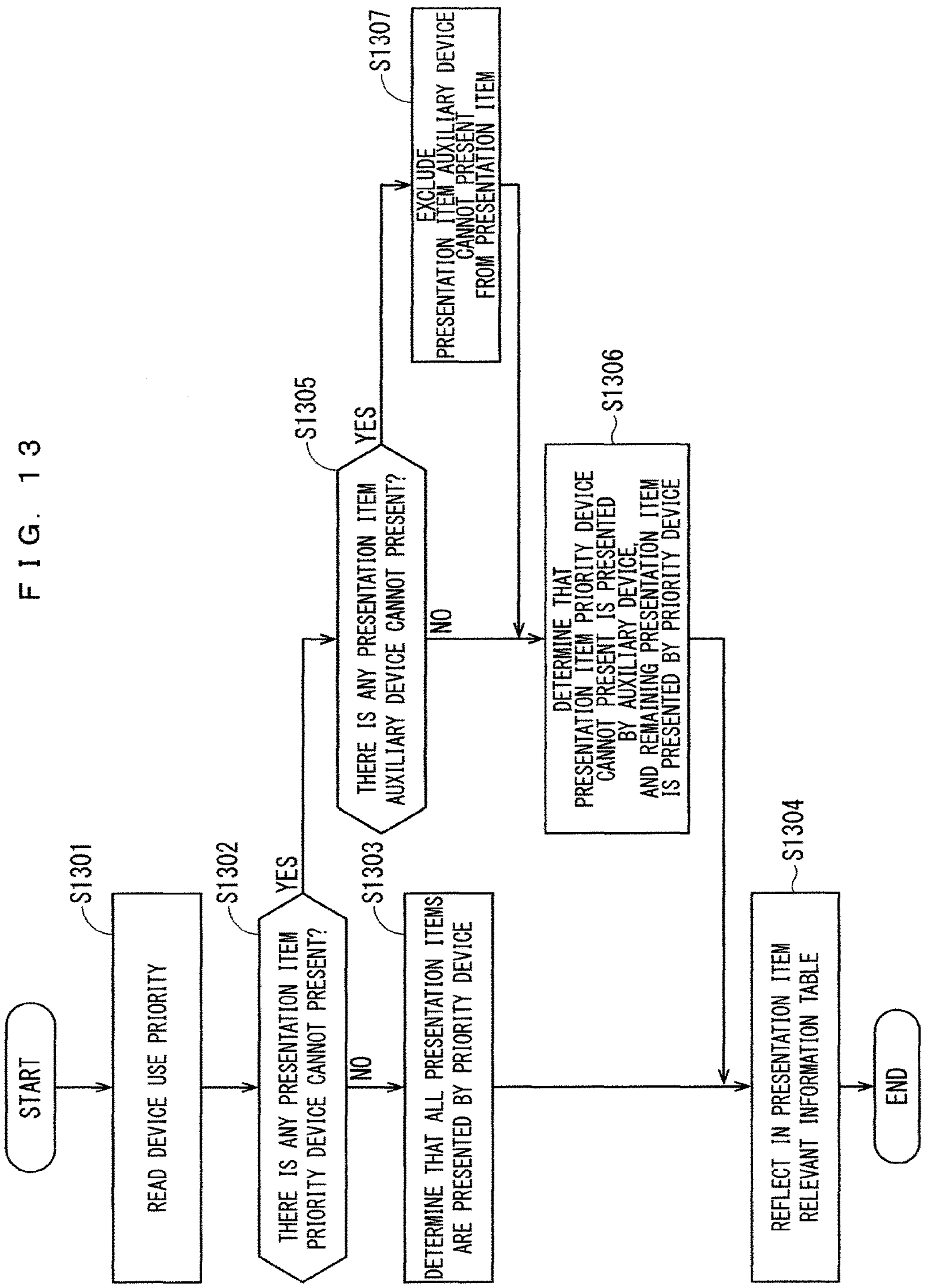
FIG. 13 is a flowchart showing processing of creating the presentation device determined version presentation item relevant information table performed by a presentation plan creation unit in Embodiment 1.

FIG. 13 is a flowchart showing the presentation device determination processing performed by the presentation plan creation unit 209. The presentation device determination processing will be described below with reference to FIG. 13. First, the presentation plan creation unit 209 reads device use priority (step S1301). The device use priority is set to each of the devices to classify the devices into a priority device, an auxiliary device, and an unused device, for example, and this information is stored in memory and the like. The device use priority may be set based on manual operation, or may automatically be set in accordance with use frequency of the output devices.

Next, determination on whether there is any presentation item that the priority device cannot present is made using information of the presentation item relevant information table 208 (step S1302). In this processing, determination on whether presentation can be performed is first made at a high detail level, determination on whether presentation can be performed is then made at a detail level decreased to a medium detail level and then to a low detail level if it is determined that presentation cannot be performed at a high detail level, and it is determined that presentation can be performed if it is determined that presentation can be performed at the decreased level. This means that it is determined that presentation cannot be performed only if it is determined that presentation cannot be performed at the low detail level.

If there is no presentation item that the priority device cannot present (No in step S1302), it is determined that all the presentation items are presented by the priority device (step S1303). Information on the presentation device and information on the set detail level are reflected in the presentation item relevant information extracted by the presentation item extraction unit 207 to create the presentation device determined version presentation item relevant information table 1201 (step S1304).

If there is any presentation item that the priority device cannot present (Yes in step S1302), determination on whether there is any presentation item that the auxiliary device cannot present is made (step S1305). If there is no presentation item that the auxiliary device cannot present (No in step S1305), it is determined that the presentation item that the priority device cannot present is presented by the auxiliary device, and the remaining presentation item is presented by the priority device (step S1306), and processing proceeds to step S1304.

If there is any presentation item that the auxiliary device cannot present (Yes in step S1305), the presentation item is excluded from the presentation plan (step S1307), and processing proceeds to step S1306.

Figure 14:
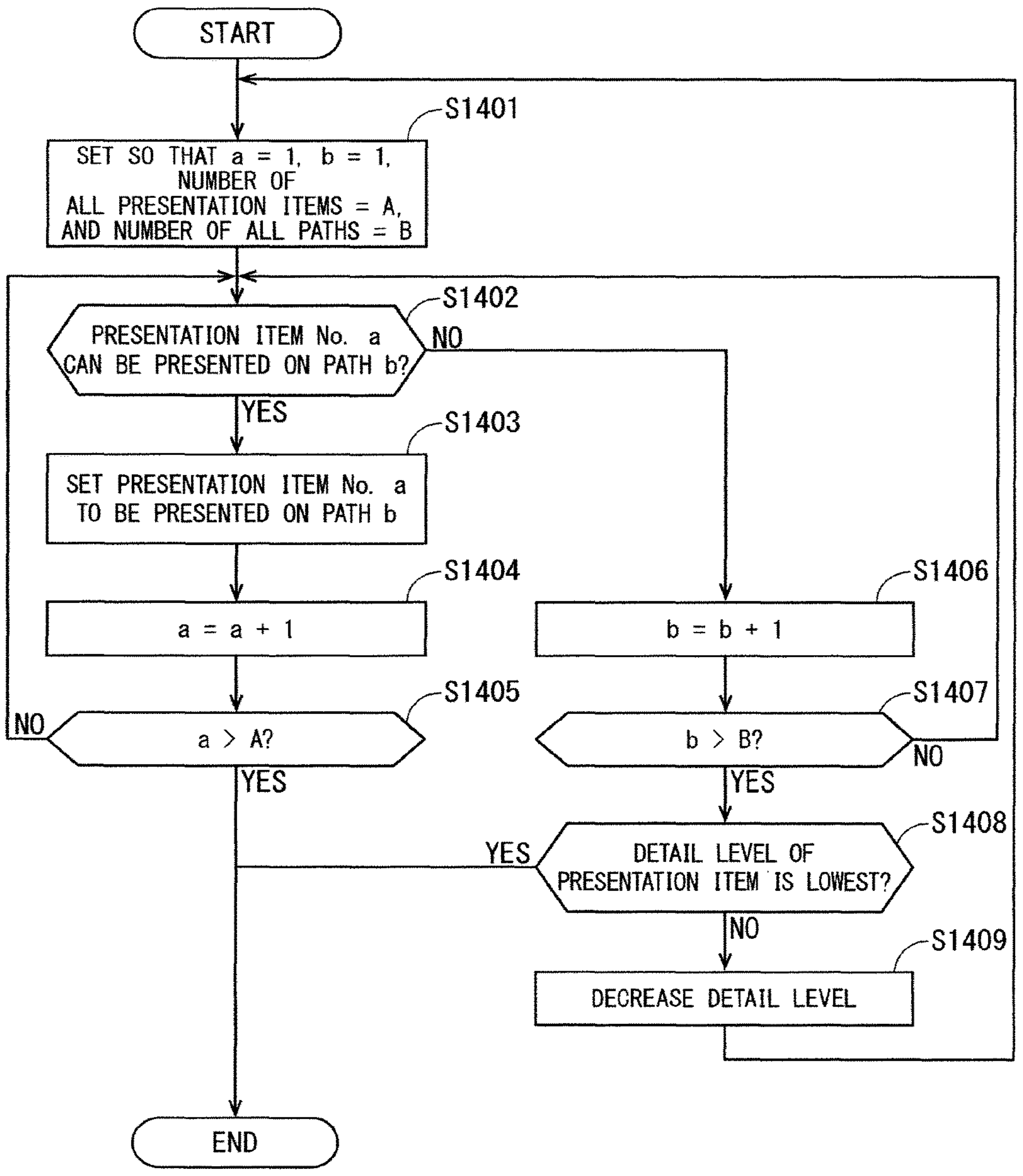
FIG. 14 is a flowchart showing a presentation plan creation phase of the presentation plan creation unit in Embodiment 1.

FIG. 14 is a flowchart showing the presentation plan creation processing performed by the presentation plan creation unit 209. The presentation plan creation processing will be described below with reference to FIG. 14. First, the presentation plan creation unit 209 sets an initial value of a value a used as a presentation item number to one, an initial value of a value b used as a path number to one, the number of all the presentation items to A, and the number of all the paths to B (step S1401).

Next, determination on whether a presentation item having a presentation item number a can be presented on a path b is made (step S1402). This processing is referred to as presentability determination processing. If it is determined that presentation can be performed in step S1402, the presentation item having the presentation item number a is set to be presented on the path b (step S1403), and this information is added to the presentation plan table 210 shown in FIG. 15. Next, the value a is increased by one (step S1404), and determination on whether $a>A$ holds true is made (step S1405). Processing ends if $a>A$ holds true, and processing returns to step S1402 if $a\leq A$ holds true.

If it is determined that presentation cannot be performed in step S1402, the value b is increased by one (step S1406), and determination on whether $b>B$ holds true is made (step S1407). If $b\leq B$ holds true, processing returns to S1402 with respect to the path b having been increased by one. If $b>B$ holds true, determination on whether the detail level of the presentation item is the lowest is made (step S1408), and, if the detail level is not the lowest, the detail level of the presentation item is decreased by one (step S1409), and processing returns to step S1401. This means that, in a case where the presentation plan cannot be created using the presentation item relevant information at the first detail level, the presentation plan is created in line with a selection condition using presentation item data at the second detail level lower than the first detail level. If the detail level of the presentation item is the lowest in step S1408, the presentation item having the presentation item number a can be presented on none of the paths, and thus is excluded from the presentation plan.

Figures 15, 16:
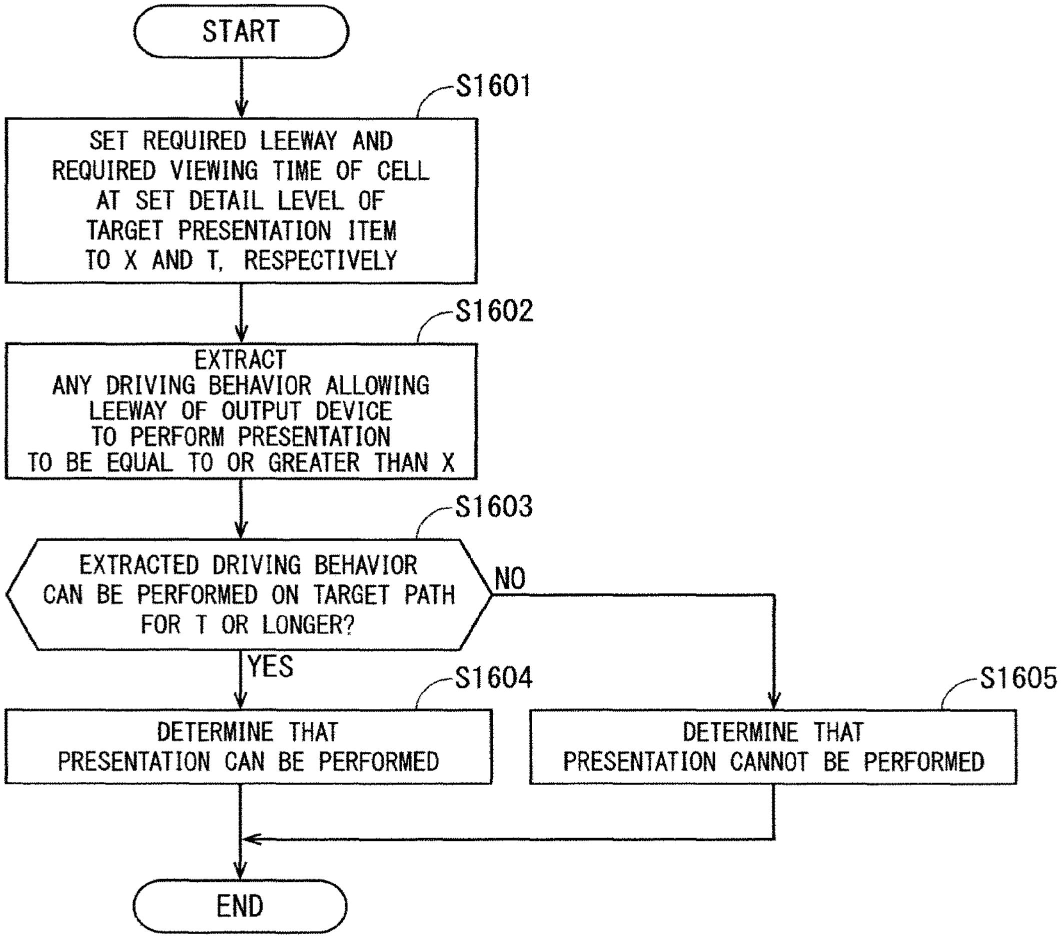
FIG. 15 is a diagram showing the structure of a presentation plan table in Embodiment 1.
FIG. 16 is a flowchart showing a presentability determination processing performed by the presentation plan creation unit in Embodiment 1.

FIG. 16 is a flowchart showing details of the presentability determination processing performed in step S1402 of FIG. 14. In the presentability determination processing, the required leeway and the required viewing time of the cell set at the detail level of a target presentation item are respectively set to X and T (step S1601).

Next, any driving behavior (stopping behavior, reduced-speed driving behavior, and constant-speed straight traveling behavior) that allows leeway of the output device to perform presentation to be equal to or greater than X is extracted from the device leeway table 206 (step S1602).

Determination on whether the driving behavior extracted in step S1602 can be performed on the target path for T or longer is made (step S1603). If the time can be secured, it is determined that presentation can be performed (step S1604), and processing proceeds to step S1403 of the presentation plan creation processing while setting the secured time to used time during which presentation cannot be performed thereafter. If the time cannot be secured, it is determined that presentation cannot be performed (step S1605), and processing proceeds to step S1406 of the presentation plan creation processing.

In the above-mentioned processing, the presentation plan creation unit 209 creates the presentation plan table shown in FIG. 15, and stores the created presentation plan table in the memory. The presentation plan table 210 includes information on the presentation item number, the set detail level, and the presentation path number. In the present embodiment, a method of controlling the detail level to present as many presentation items as possible while fixing a used device by setting the priority device is used. However, the presentation plan table 210 may be created using the presentation device determined version presentation item relevant information table 1201, the behavior time for each traveling path prediction results 1101, and the device leeway table 206 by another method. For example, a method of freely selecting the presentation device to present as many presentation items as possible while fixing the detail level of the presentation items may be used.

Although the application that presents the tourism information around the destination in a case where the destination is set is described in the present embodiment, not the tourism information around the destination but the facility information on the path may be presented. The present embodiment is applicable to an application that presents current information, which is typified by weather information and news information, whose contents change over time and to an application that presents information in accordance with user's preference.

The information presentation apparatus 110 sometimes downloads presentation data from outside the vehicle to present the presentation item in accordance with the presentation plan. The presentation data includes various forms of data, such as image data, text data, and audio data. As the presentation plan table 210 is set, the information presentation apparatus 110 can download presentation data relating to the presentation items included in the presentation plan table 210 from outside the vehicle in advance when there is room in a communication band, and store the presentation data in in-vehicle memory. If the presentation data is required to be processed in accordance with the output device performing presentation, the presentation data can be processed in advance when the information presentation apparatus 110 has extra resources.

<A-2. Effects>

The presentation plan creation apparatus 100A according to Embodiment 1 is a presentation plan creation apparatus for creating a presentation plan of a presentation item presented by a plurality of output devices installed in a moving object, the presentation plan creation apparatus including: the path setting unit 201 that sets a path of the moving object to a destination; the path division unit 202 that divides the path into divided paths in accordance with a road type; the driving behavior proportion prediction unit 203 that predicts a driving behavior proportion for each of the divided paths, the driving behavior proportion being a proportion of a total time of performing each of a plurality of driving behaviors in a time of traveling on the divided path; the device leeway acquisition unit 205 that acquires device leeway data indicating, for each of combinations of the output devices and the driving behaviors, leeway representing the amount of information capable of being presented by the output devices; the presentation item extraction unit 207 (presentation item acquisition unit) that acquires presentation item relevant information (presentation item data) indicating required leeway and a required viewing time, the required leeway being the leeway of each of the output devices required to present the presentation item, the required viewing time being a time required to view the presentation item; and the presentation plan creation unit 209 that creates a presentation plan in which a selected device and a selected path are determined in line with a selection condition, the selected device being a device to present the presentation item and being selected from the output devices, the selected path being a path on which the moving object travels when the selected device presents the presentation item and being selected from the divided paths. The above-mentioned selection condition is that a time of performing, on the selected path, any of the driving behaviors that allows the leeway of the selected device to be equal to or greater than the required leeway required to present the presentation item is equal to or longer than the required viewing time required to view the presentation item. The presentation plan can thus appropriately be created in view of driver's leeway determined by the driving behavior and the characteristics of the output device.

The presentation item data includes a plurality of pieces of presentation item data in accordance with a detail level of contents of the presentation item, the presentation item extraction unit 207 (presentation item acquisition unit) acquires a plurality of pieces of presentation item data at different detail levels for the presentation item, and, when the presentation plan creation unit 209 fails to create the presentation plan in line with the selection condition using a piece of presentation item data at a first detail level, the presentation plan creation unit 209 creates the presentation plan in line with the selection condition using a piece of presentation item data at a second detail level lower than the first detail level. The presentation plan can thus be created by decreasing the detail level of the presentation item if there is no output device and no divided path meeting the condition.

In a case where the presentation item includes information on the destination or facility information around the path the presentation plan can appropriately be created in view of the characteristics of the output device in an application that presents the information on the destination and the facility information around the path.

In a case where the presentation item includes weather information, news information, or event information, the presentation plan can appropriately be created in view of the characteristics of the output device in the application that presents current information, such as the weather information, the news information, and the event information, whose contents change over time.

The information presentation apparatus 110 in Embodiment 1 receives presentation data relating to the presentation item included in the presentation plan from an external server at a timing based on a communication band, and thus the presentation data can be received when there is room in the communication band.

The information presentation apparatus 110 in Embodiment 1 processes the presentation data relating to the presentation item included in the presentation plan in accordance with the selected device at a timing based on a calculated resource of the information presentation apparatus 110, and thus the presentation data can be processed when there are extra calculated resources.

A presentation plan creation method according to Embodiment 1 is a presentation plan creation method of creating a presentation plan of a presentation item presented by a plurality of output devices installed in a moving object, the presentation plan creation method including: setting a path of the moving object to a destination; dividing the path into divided paths in accordance with a road type; predicting a driving behavior proportion for each of the divided paths, the driving behavior proportion being a proportion of a total time of performing each of a plurality of driving behaviors in a time of traveling on the divided path; acquiring device leeway data indicating, for each of combinations of the output devices and the driving behaviors, leeway representing the amount of information capable of being presented by the output devices; acquiring presentation item data indicating required leeway and a required viewing time, the required leeway being the leeway of each of the output devices required to present the presentation item, the required viewing time being a time required to view the presentation item; and creating a presentation plan in which a selected device and a selected path are determined in line with a selection condition, the selected device being a device to present the presentation item and being selected from the output devices, the selected path being a path on which the moving object travels when the selected device presents the presentation item and being selected from the divided paths, wherein the selection condition is that a time of performing, on the selected path, any of the driving behaviors that allows the leeway of the selected device to be equal to or greater than the required leeway required to present the presentation item is equal to or longer than the required viewing time required to view the presentation item. The presentation plan can thus appropriately be created in view of driver's leeway determined by the driving behavior and the characteristics of the output device.

B. Embodiment 2

<B-1. Configuration and Operation>

FIG. 17 is a block diagram of a presentation plan creation apparatus 100B in Embodiment 2 of the present invention. The configuration of the presentation plan creation apparatus 100B corresponds to the configuration of the presentation plan creation apparatus 100A in Embodiment 1 to which a traveling state determination unit 1701 and an offset for each traveling state setting unit 1702 have been added, and in which the device leeway acquisition unit 205 has been replaced with a device leeway calculation unit 1703.

The traveling state determination unit 1701 determines a traveling state of a vehicle based on information acquired from the in-vehicle sensor 101, the in-vehicle network 102, and the map DB 103, and transmits results of determination to the offset for each traveling state setting unit 1702. The traveling state includes a traveling status typified by weather and driver's characteristics typified by a driving skill or a degree of fatigue. The traveling state to be calculated is set in advance.

The offset for each traveling state setting unit 1702 calculates an offset value to be added to leeway from a leeway offset table and the traveling state received from the traveling state determination unit 1701. The calculated offset value is transmitted to the device leeway calculation unit 1703. FIG. 18 shows a leeway offset table 1801. In the case of a user who is not good at driving, for example, an offset value of −1 is set to all the devices. In the case of backlighting, an offset value of −1 is set to the head-up display as the head-up display is expected to be less visible. The relationship between the traveling state and the offset value may be determined from history information so far, or may manually be set in advance by a user.

The device leeway calculation unit 1703 calculates leeway of each device in view of the offset received from the offset for each traveling state setting unit 1702. Specifically, the offset value received from the offset for each traveling state setting unit 1702 is added to the device leeway for each driving behavior including the stopping behavior, the reduced-speed driving behavior, and the stable straight traveling behavior as acquired from the device leeway table 206 shown in FIG. 9 to calculate the device leeway reflecting offsets. In other words, the device leeway calculation unit 1703 has a function of the device leeway acquisition unit 205 according to Embodiment 1 and a function of a device leeway update unit of updating the device leeway acquired by the device leeway acquisition unit 205 based on the traveling state. The presentation plan creation unit 209 creates the presentation plan using the device leeway reflecting the offsets. Configuration other than the above-mentioned configuration is similar to that in Embodiment 1, and is thus not described.

With the above-mentioned configuration, the presentation plan can be created while considering the traveling status and the effects of the difference in traveling status including the driver's characteristics for each device.

<B-2. Effects>

The presentation plan creation apparatus 100B in Embodiment 2 includes, in addition to the components of the presentation plan creation apparatus 100A in Embodiment 1, the traveling state determination unit 1701 (traveling state acquisition unit) that acquires a traveling state including a traveling status of the moving object and characteristics of a driver of the moving object; and the device leeway calculation unit 1703 (device leeway update unit) that updates the device leeway data based on the traveling state, wherein the presentation plan creation unit 209 creates the presentation plan based on the device leeway data updated by the device leeway update unit. The presentation plan can thus be created while considering the traveling status and the effects of the difference in traveling status including the driver's characteristics for each device.

C. Embodiment 3

<C-1. Configuration and Operation>

FIG. 19 is a block diagram of a presentation plan creation apparatus 100C and peripheral devices in Embodiment 3 of the present invention. As shown in FIG. 19, the presentation plan creation apparatus 100C differs from the presentation plan creation apparatus 100A in Embodiment 1 in that the presentation plan creation apparatus 100C performs communication with an external server 1901. The presentation plan creation apparatus 100C receives traveling history information of a host vehicle and other vehicles from the external server 1901. Communication between the presentation plan creation apparatus 100C and the external server 1901 may be performed using any network including the Internet.

FIG. 20 is a block diagram of the presentation plan creation apparatus 100C. As shown in FIG. 20, the configuration of the presentation plan creation apparatus 100C corresponds to the configuration of the presentation plan creation apparatus 100A in Embodiment 1 to which a driving behavior table update unit 2001 has been added. The driving behavior table update unit 2001 updates the driving behavior time calculation table 401, the driving behavior number calculation table 402, and the driving behavior time during traffic congestion calculation table 403 included in the driving behavior table 204 using a traveling history of the host vehicle and traveling histories of other vehicles received from the external server 1901. In other words, the driving behavior table update unit 2001 functions as a traveling history acquisition unit that acquires the traveling history information of the host vehicle and other vehicles.

Specifically, in processing of updating the driving behavior time calculation table 401, average values of a stopping time, a reduced-speed driving time, and a stable straight traveling time that vehicles require to travel on roads of respective road types in advance are set to the driving behavior time calculation table 401 using the traveling histories of the host vehicle and other vehicles. For example, the driving behavior time calculation table 401 is updated using an average value of vehicles traveling during the same time period on another day or an average value of vehicles traveling during an earlier time period than the host vehicle on the same day.

Processing of updating the driving behavior number calculation table 402 is performed in a similar manner to the processing of updating the driving behavior time calculation table 401, and average values of the number of stopping times, the number of reduced-speed driving times, and the number of stable straight traveling times that vehicles require to travel on roads of respective road types in advance are set to the driving behavior number calculation table 402.

Processing of updating the driving behavior time during traffic congestion calculation table 403 is also performed in a similar manner to the processing of updating the driving behavior time calculation table 401, and average values of a stopping time and a reduced-speed driving time of vehicles including other vehicles during traffic congestion in the same time period on the same traveling path are set to the driving behavior time during traffic congestion calculation table 403. Stopping times and reduced-speed driving times of vehicles currently traveling on a target path may be used.

With this configuration, a time that the host vehicle or other vehicles actually requires/require on a divided path in the past can be used to predict the driving behavior proportion on the divided path, enabling prediction with high precision. The presentation plan can thus be created appropriately.

<C-2. Effects>

The presentation plan creation apparatus 100C according to Embodiment 3 includes a database (driving behavior information storage) that stores the driving behavior table 204 (driving behavior information) indicating a relationship between a road type and the driving behavior proportion; and the driving behavior table update unit 2001 (driving behavior information update unit) that acquires traveling history information of a host vehicle or other vehicles, and updates the driving behavior table 204 based on the traveling history information, wherein the driving behavior proportion prediction unit 203 predicts the driving behavior proportion for each of the divided paths based on the driving behavior table 204 updated by the driving behavior table update unit 2001. The driving behavior proportion can be predicted with high precision using the traveling history information, and thus the presentation plan can appropriately be created.

D. Embodiment 4

<D-1. Configuration and Operation>

The configuration of peripheral devices of a presentation plan creation apparatus 100D in Embodiment 4 is similar to the configuration of the peripheral devices of the presentation plan creation apparatus 100C in Embodiment 3 shown in FIG. 19.

FIG. 21 is a block diagram of the presentation plan creation apparatus 100D. The configuration of the presentation plan creation apparatus 100D corresponds to the configuration of the presentation plan creation apparatus 100A in Embodiment 1 shown in FIG. 2 to which a presentation item relevant information table update unit 2101 has been added.

The presentation item relevant information table update unit 2101 updates the presentation item relevant information table 208 using information received from the external server 1901 or the in-vehicle information equipment. In other words, the presentation item relevant information (presentation item data) acquired by the presentation item extraction unit 207 can be updated based on the information received from the external server 1901 or the in-vehicle information equipment. The type of the information that the presentation item relevant information table update unit 2101 receives from the external server 1901 or the in-vehicle information equipment differs depending on an application. For example, in an application that presents information on tourist sites, the presentation item relevant information table 208 is updated when the tourism information is changed. The presentation item relevant information table 208 may be updated in accordance with a time period or a season. The number of presentation items targeted for update in the presentation item relevant information table 208 may be set in accordance with user's preference.

With this configuration, the presentation item relevant information table update unit 2101 updates the presentation item relevant information table 208 using the information received from the external server 1901 or the in-vehicle information equipment to keep the presentation item relevant information table 208 up to date and to avoid creation of the presentation plan based on an old status.

<D-2. Effects>

In the presentation plan creation apparatus 100D in Embodiment 4, the presentation item relevant information (presentation item data) acquired by the presentation item extraction unit 207 (presentation item data acquisition unit) is capable of being updated based on information received from the external server 1901. The presentation item relevant information table 208 can be kept up to date, and thus creation of the presentation plan based on an old status can be avoided.

E. Embodiment 5

<E-1. Configuration and Operation>

The configuration of peripheral devices of a presentation plan creation apparatus 100E in Embodiment 5 is similar to the configuration of the peripheral devices of the presentation plan creation apparatus 100A in Embodiment 1 shown in FIG. 1.

The presentation plan creation apparatus 100E acquires a presentation status of the presentation items from the information presentation apparatus 110, and updates the presentation plan based on the presentation status.

Figure 22:
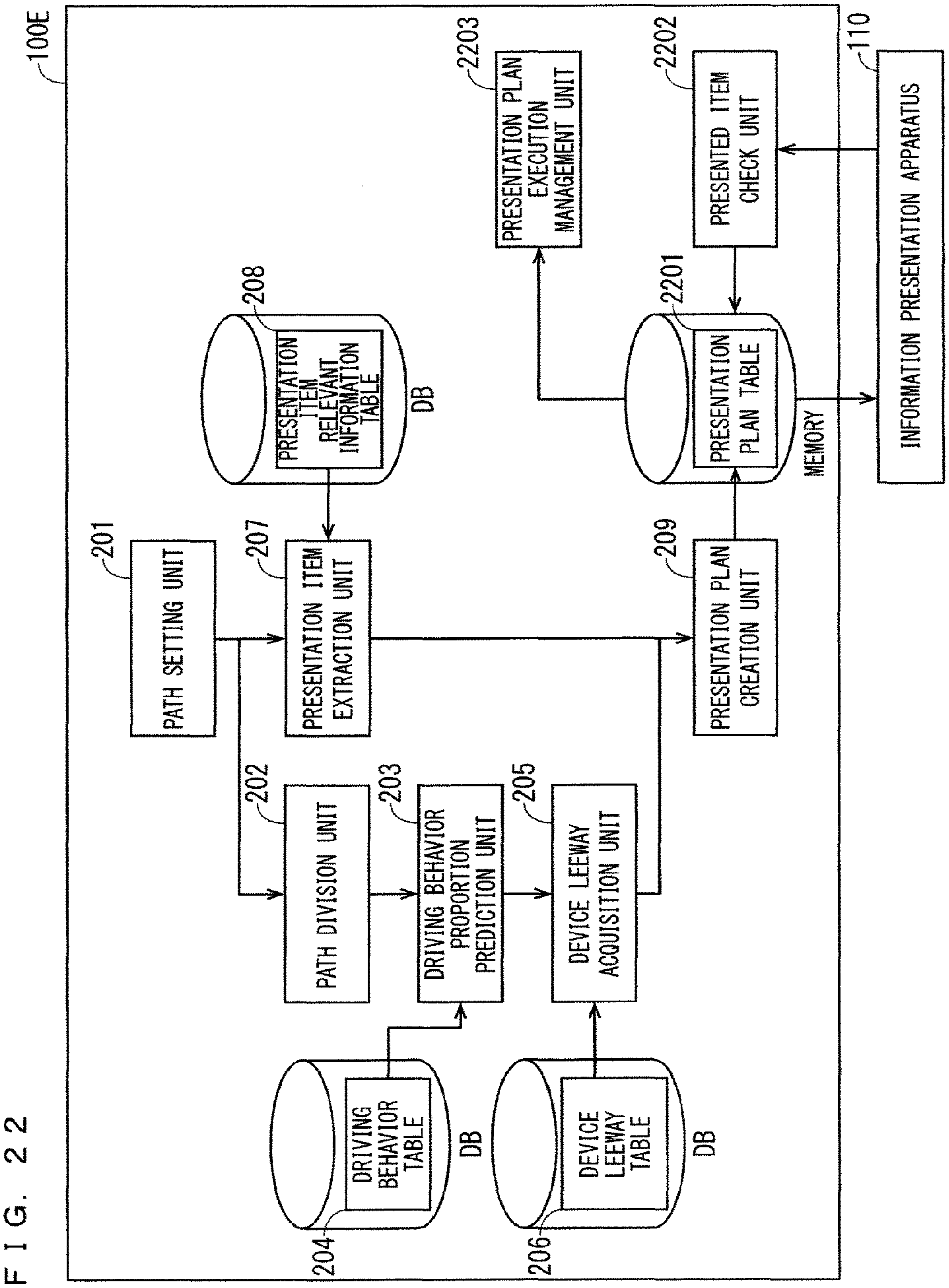
FIG. 22 is a block diagram of a presentation plan creation apparatus in Embodiment 5.

FIG. 22 is a block diagram of the presentation plan creation apparatus 100E. The presentation plan creation apparatus 100E includes a presented item check unit 2202 and a presentation plan execution management unit 2203 in addition to the configuration of the presentation plan creation apparatus 100A in Embodiment 1 shown in FIG. 2. The presentation plan creation apparatus 100E also includes a presentation plan table 2201 in place of the presentation plan table 210 included in the presentation plan creation apparatus 100A.

The presented item check unit 2202 acquires the presentation status of the presentation items from the information presentation apparatus 110, and adds information on the presentation status to the presentation plan table 2201. That is to say, information PRESENTED is added to a presentation item having been presented, whereas information NOT PRESENTED is added to a presentation item not having been presented. The presentation plan table 2201 is similar to the presentation plan table 210 except that the presentation plan table 2201 includes the information on the presentation status.

FIG. 23 is a diagram showing the structure of the presentation plan table 2201.

The presentation plan execution management unit 2203 compares a presentation plan determined before traveling and the presentation status of the presentation items with reference to the presentation plan table 2201. If the number of presentation items to be presented based on the presentation plan on the traveling path so far is greater than the number of presentation items having been presented, the presentation plan execution management unit 2203 determines that not all the presentation items included in the presentation plan and not having been presented can be presented, and instructs the presentation plan creation unit 209 to create the presentation plan again by decreasing the detail level of the presentation items so that all the items can be presented.

If the number of presentation items to be presented based on the presentation plan on the traveling path so far is smaller than the number of presentation items having been presented, the presentation plan execution management unit 2203 determines that all the presentation items can be presented before arrival at the destination even when the detail level of the presentation items included in the presentation plan and not having been presented is increased, and instructs the presentation plan creation unit 209 to create the presentation plan again by increasing the detail level of the presentation items so that all the items can be presented.

With the above-mentioned configuration, if there is a difference between the presentation plan created before traveling and the results of presentation of the presentation items presented based on the driving leeway measured during actual traveling, the deviation of the plan can be corrected during traveling. This increases the possibility of presenting all the presentation items in detail before arrival at the destination.

E-2. Effects

The presentation plan creation apparatus 100E in Embodiment 5 further includes the presentation plan execution management unit 2203 (presentation status management unit) that manages a presentation status of the presentation item by the output devices, wherein the presentation plan creation unit 209 updates the presentation plan based on the presentation status. If there is a difference between the results of presentation of the presentation items presented based on the driving leeway measured during actual traveling and the presentation plan, the possibility of presenting all the presentation items in detail through correction of the presentation plan is increased.

F. Embodiment 6

<F-1. Configuration and Operation>

Figure 24:
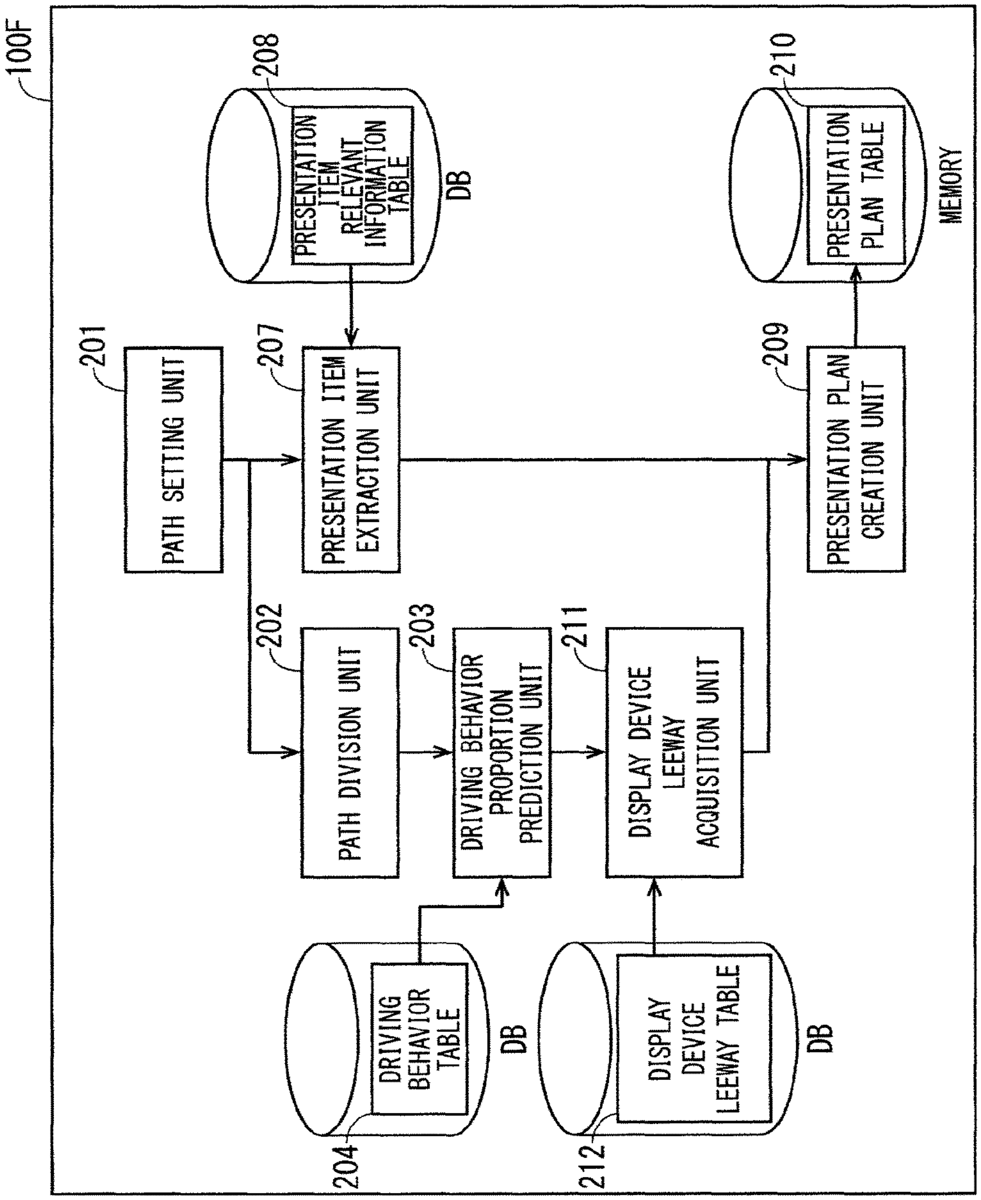
FIG. 24 is a block diagram of a presentation plan creation apparatus in Embodiment 6.

FIG. 24 is a block diagram of a presentation plan creation apparatus 100F in Embodiment 6 of the present invention. The configuration of the presentation plan creation apparatus 100F corresponds to the configuration of the presentation plan creation apparatus 100A in Embodiment 1 in which the device leeway acquisition unit 205 has been replaced with a display device leeway acquisition unit 211, and the device leeway table 206 is replaced with a display device leeway table 212.

The display device leeway acquisition unit 211 acquires, with reference to the display device leeway table 212, leeway (device leeway) of each output device for each driving behavior whose proportion is predicted by the driving behavior proportion prediction unit 203.

FIG. 25 is a diagram showing the structure of the display device leeway table 212. As shown in FIG. 25, the display device leeway table 212 corresponds to the device leeway table 206 in Embodiment 1 from which information on leeway of an audio output device, such as a speaker, has been removed.

The presentation plan creation unit 209 creates the presentation plan table 210 using the presentation item extracted by the presentation item extraction unit 207, the behavior time for each traveling path prediction results 1101 of the driving behavior proportion prediction unit 203, and the display device leeway table 212 acquired by the display device leeway acquisition unit 211.

The presentation plan creation unit 209 herein creates the presentation plan table 210 by setting the leeway of the audio output device not included in the display device leeway table 212 for all the driving behaviors to a maximum value of the required leeway. This is because presentation of information by the audio output device, such as a speaker, has little effect on driving, and thus can be considered to have little effect on a driver who is used to driving.

Although the display device leeway table 212, which does not include the leeway of the audio output device, is used in the above-mentioned description, the device leeway table 206, which includes the leeway of the audio output device, may be used as in Embodiment 1 by setting the leeway of the audio output device for all the driving behaviors to the maximum value of the required leeway in the device leeway table 206.

Configuration other than the above-mentioned configuration is similar to that Embodiment 1, and is thus not described.

<F-2. Effects>

In the presentation plan creation apparatus 100F in Embodiment 6, the plurality of output devices installed in the moving object include an audio output device, and the presentation plan creation unit 209 creates the presentation plan by setting leeway of the audio output device to a maximum value of the required leeway required to present the presentation item. The presentation item to be presented by the audio output device can be presented on any divided path, eliminating the need for the processing of calculating the leeway of the audio output device for each divided path in creating the presentation plan (steps S1602 and 1603 of FIG. 16). This reduces a calculation load put when the presentation plan creation unit 209 creates the presentation plan.

G. Embodiment 7

<G-1. Configuration and Operation>

Figure 26:
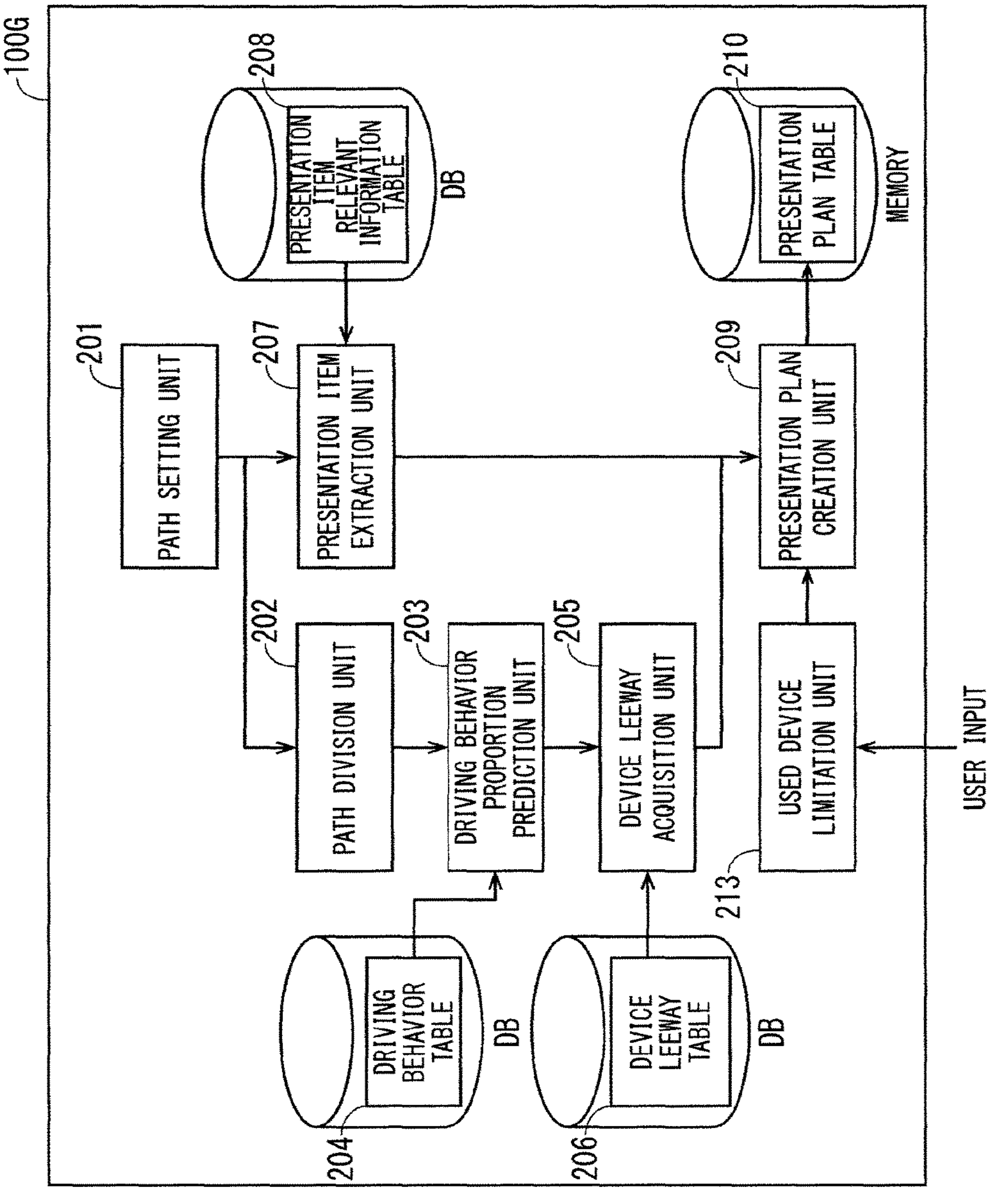
FIG. 26 is a block diagram of a presentation plan creation apparatus in Embodiment 7.

FIG. 26 is a block diagram of a presentation plan creation apparatus 100G in Embodiment 7 of the present invention. The configuration of the presentation plan creation apparatus 1000 corresponds to the configuration of the presentation plan creation apparatus 100A in Embodiment 1 to which a used device limitation unit 213 has been added.

The used device limitation unit 213 acquires used device limitation information through user input, and outputs the acquired used device limitation information to the presentation plan creation unit 209. The used device limitation information herein refers to information indicating any of a plurality of output devices that can be used to present a presentation item (hereinafter, referred to as a "usable device"). In other words, the used device limitation unit 213 selects, as the usable device, at least one output device from the plurality of output devices.

The user can input the used device limitation information through the in-vehicle information equipment, such as a car navigation system, at the start of traveling of the vehicle or during traveling of the vehicle. For example, the usable device may directly be designated, or any output device not desired to be used (hereinafter, referred to as an "unusable device") may be designated. In this case, any output device other than the unusable device is the usable device.

The presentation plan creation unit 209 creates the presentation plan table 210 using the presentation item extracted by the presentation item extraction unit 207, the behavior time for each traveling path prediction results 1101 of the driving behavior proportion prediction unit 203, and the device leeway table 206 acquired by the device leeway acquisition unit 205. The presentation plan creation unit 209, however, creates the presentation plan table 210 by using a minimum value of 0 as the leeway of the unusable device based on the used device limitation information without using the value set in the device leeway table 206. This means that the presentation plan creation unit 209 creates the presentation plan table 210 so that only the usable device is determined as a selected device to present the presentation item.

Configuration other than the above-mentioned configuration is similar to that in Embodiment 1, and is thus not described.

<G-2. Effects>

The presentation plan creation apparatus 100G in Embodiment 7 further includes the used device limitation unit 213 that selects, in response to user input, at least one output device from the plurality of output devices installed in the moving object, such as a vehicle, in addition to the configuration of the presentation plan creation apparatus 100A in Embodiment 1. The presentation plan creation unit 209 creates the presentation plan so that only the output device selected by the used device limitation unit 213 is determined as the selected device. The output device not selected by the used device limitation unit 213 is not used to present information, and thus can freely be used in other applications. For example, in a case where the user designates the speaker as the unusable device, or designates any output device other than the speaker as the usable device, the used device limitation unit 213 uses the output device other than the speaker to create the presentation plan, and thus the speaker can be used to playback music. Similarly, the center display may be used to display a map without being used in the presentation plan to thereby exclude a specific output device from the presentation plan in response to a user's request.

<H. Hardware Configuration>

Figure 27:
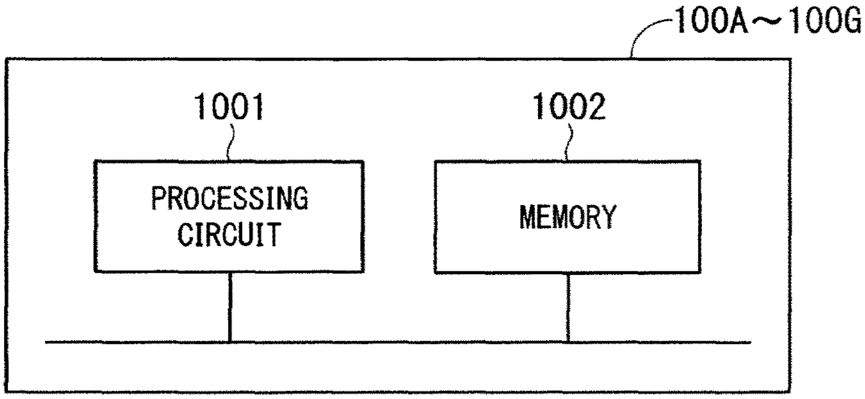
FIG. 27 shows the hardware configuration of the presentation plan creation apparatus.

FIG. 27 shows the hardware configuration for achieving the presentation plan creation apparatuses 100A to 100G in Embodiments 1 to 7. As shown in FIG. 27, the presentation plan creation apparatuses 100A to 100G are each achieved by a processing circuit 1001 and memory 1002. That is to say, the path setting unit 201, the path division unit 202, the driving behavior proportion prediction unit 203, the device leeway acquisition unit 205, the presentation item extraction unit 207, the presentation plan creation unit 209, the traveling state determination unit 1701, the offset for each traveling state setting unit 1702, the device leeway calculation unit 1703, the driving behavior table update unit 2001, the presentation item relevant information table update unit 2101, the presented item check unit 2202, the presentation plan execution management unit 2203, the display device leeway acquisition unit 211, and the used device limitation unit 213 in the presentation plan creation apparatuses in Embodiments 1 to 7 are achieved by the processing circuit 1001 shown in FIG. 27. This means that the processing circuit 1001 includes the path setting unit 201, the path division unit 202, the driving behavior proportion prediction unit 203, the device leeway acquisition unit 205, the presentation item extraction unit 207, the presentation plan creation unit 209, the traveling state determination unit 1701, the offset for each traveling state setting unit 1702, the device leeway calculation unit 1703, the driving behavior table update unit 2001, the presentation item relevant information table update unit 2101, the presented item check unit 2202, the presentation plan execution management unit 2203, the display device leeway acquisition unit 211, and the used device limitation unit 213. The memory 1002 includes the driving behavior table 204, the device leeway table 206, the presentation item relevant information table 208, the presentation plan tables 210 and 2201, and the display device leeway table 212. Dedicated hardware or a processor for running a program stored in the memory may be applied to the processing circuit 1001. The processor is a central processing unit, a processing unit, an arithmetic unit, a microprocessor, a microcomputer, a digital signal processor, or the like, for example.

In a case where the processing circuit 1001 is dedicated hardware, the processing circuit 1001 is a single circuit, a composite circuit, a programmed processor, a parallel-programmed processor, an application specific integrated circuit (ASIC), a field programmable gate array (FPGA), or combinations thereof. A plurality of processing circuits may achieve functions of respective units including the presentation plan creation unit 209, or a single processing circuit may collectively achieve the functions.

Figure 28:
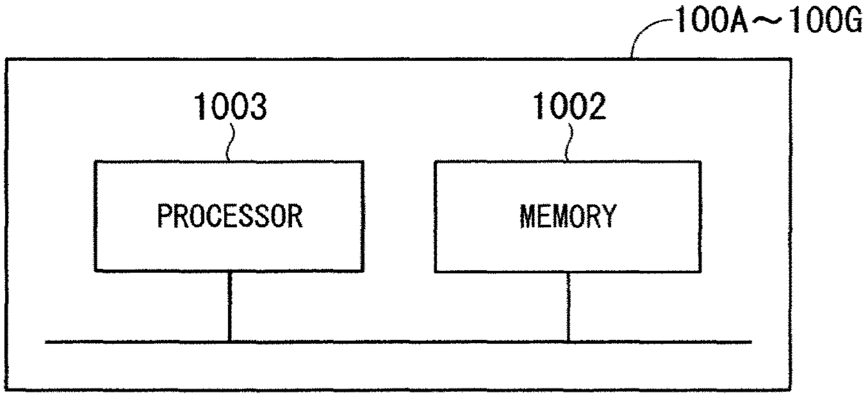
FIG. 28 shows the hardware configuration of the presentation plan creation apparatus.

In a case where the processing circuit 1001 is a processor, functions of the presentation plan creation unit 209 and the like are achieved by combination with software and the like (software, firmware, or software and firmware). The software and the like are described as a program, and stored in the memory. As shown in FIG. 28, a processor 1003 applied to the processing circuit 1001 reads and runs the program stored in the memory 1002 to achieve functions of respective units. This means that the presentation plan creation apparatus 100A includes the memory 1002 for storing a program eventually performing: a step of setting a path of the moving object to a destination; a step of dividing the path into divided paths in accordance with a road type; a step of predicting, for each of the divided paths, a proportion of a total time of performing each of a plurality of driving behaviors in a time of traveling on the divided path; a step of acquiring device leeway data indicating, for each of combinations of the output devices and the driving behaviors, leeway representing the amount of information capable of being presented by the output devices; a step of acquiring presentation item data indicating required leeway and a required viewing time, the required leeway being the leeway of each of the output devices required to present the presentation item, the required viewing time being a time required to view the presentation item; and a step of creating a presentation plan in which a selected device and a selected path are determined in line with a selection condition, the selected device being a device to present the presentation item and being selected from the output devices, the selected path being a path on which the moving object travels when the selected device presents the presentation item and being selected from the divided paths, when the processing circuit 1001 runs the program. In other words, this program causes a computer to perform procedure and methods performed by the presentation plan creation unit 209 and the like. The memory 1002 herein includes at least one of nonvolatile or volatile semiconductor memory, such as random access memory (RAM), read only memory (ROM), flash memory, electrically programmable read only memory (EPROM), and electrically erasable programmable read only memory (EEPROM), and a hard disk drive (HDD), a magnetic disk, a flexible disk, an optical disc, a compact disc, a minidisc, a digital versatile disk (DVD), and a drive apparatus for them.

Configuration in which functions of the presentation plan creation unit 209 and the like are achieved either by the hardware or by the software is described so far. Configuration, however, is not limited to this configuration, and some units such as the presentation plan creation unit 209 may be achieved by dedicated hardware, and the other units may be achieved by software and the like. For example, functions of the presentation plan creation unit 209 and the like can be achieved by the processing circuit as the dedicated hardware, and functions of the other units can be achieved by the processing circuit 1001 as the processor 1003 reading and running the program stored in the memory 1002.

As described above, the processing circuit 1001 can achieve the above-mentioned functions by the hardware, the software, or a combination of the hardware and the software.

Embodiments of the present invention can freely be combined with each other, and can be modified or omitted as appropriate within the scope of the invention While the invention has been described in detail, the foregoing description is in all aspects illustrative and not restrictive. It is therefore understood that numerous modifications not having been described as examples can be devised without departing from the scope of the invention.

REFERENCE SIGNS LIST

100, 100A, 100B, 100C, 100D, 100E, 100F, and 1000 presentation plan creation apparatus; 101 in-vehicle sensor; 102 in-vehicle network; 103 map DB; 104 center display; 105 head-up display; 106 instrument panel; 107 speaker; 110 information presentation apparatus; 201 path setting unit; 202 path division unit; 203 driving behavior proportion prediction unit; 204 driving behavior table; 205 device leeway acquisition unit; 206 device leeway table; 207 presentation item extraction unit; 208 presentation item relevant information table; 209 presentation plan creation unit; 210 and 2201 presentation plan table; 211 display device leeway acquisition unit; 212 display device leeway table; 213 used device limitation unit; 401 driving behavior time calculation table; 402 driving behavior number calculation table; 403 driving behavior time during traffic congestion calculation table; 1001 processing circuit; 1002 memory; 1003 processor; 1201 presentation device determined version presentation item relevant information table; 1701 traveling state determination unit; 1702 offset for each traveling state setting unit; 1703 device leeway calculation unit; 1801 leeway offset table; 1901 external server; 2001 driving behavior table update unit; 2101 presentation item relevant information table update unit; 2202 presented item check unit; and 2203 presentation plan execution management unit.

The invention claimed is:

1. A presentation plan creation apparatus for creating a presentation plan of a presentation item presented by a plurality of output devices installed in a moving object, the presentation plan creation apparatus comprising:

a processor to execute a program; and a memory to store the program which, when executed by the processor, performs processes of:

setting a path of said moving object to a destination;

dividing said path into divided paths in accordance with a road type;

predicting a driving behavior proportion for each of said divided paths, the driving behavior proportion being a proportion of a total time of performing each of a plurality of driving behaviors in a time of traveling on the divided path;

acquiring device leeway data indicating, for each of combinations of said output devices and said driving behaviors, leeway representing the amount of information capable of being presented by said output devices;

acquiring presentation item data indicating required leeway and a required viewing time, the required leeway being said leeway of each of said output devices required to present said presentation item, the required viewing time being a time required to view said presentation item; and creating a presentation plan in which a selected device and a selected path are determined in line with a selection condition, the selected device being a device to present said presentation item and being selected from said output devices, the selected path being a path on which said moving object travels when said selected device presents said presentation item and being selected from said divided paths, wherein said selection condition is that a time of performing, on said selected path, any of said driving behaviors that allows said leeway of said selected device to be equal to or greater than said required leeway required to present said presentation item is equal to or longer than said required viewing time required to view said presentation item.

2. The presentation plan creation apparatus according to claim 1, wherein said plurality of output devices include an audio output device, and said presentation plan is created by setting leeway of said audio output device to a maximum value of said required leeway required to present said presentation item.

3. The presentation plan creation apparatus according to claim 1, wherein said presentation item data comprises a plurality of pieces of presentation item data in accordance with a detail level of contents of said presentation item, acquiring said presentation item data includes acquiring a plurality of pieces of presentation item data at different detail levels for said presentation item, and when said presentation plan is not capable of being created in line with said selection condition using a piece of presentation item data at a first detail level, said presentation plan is created in line with said selection condition using a piece of presentation item data at a second detail level lower than said first detail level.

4. The presentation plan creation apparatus according to claim 1, wherein said program further performs, when executed by the processor, processes of:

acquiring a traveling state including a traveling status of said moving object and characteristics of a driver of said moving object; and updating said device leeway data based on said traveling state, wherein said presentation plan is created based on said device leeway data updated based on traveling state.

5. The presentation plan creation apparatus according to claim 1, wherein said program further performs, when executed by the processor, process of:

storing driving behavior information indicating a relationship between a road type and said driving behavior proportion; and acquiring traveling history information of a host vehicle or other vehicles, and updates said driving behavior information based on said traveling history information, wherein said driving behavior proportion is predicted for each of said divided paths based on said driving behavior information updated based on said traveling history information.

6. The presentation plan creation apparatus according to claim 1, wherein said presentation item data is capable of being updated based on information received from an external server.

7. The presentation plan creation apparatus according to claim 1, wherein said program further performs, when executed by the processor, a process of managing a presentation status of said presentation item by said output devices, wherein said presentation plan is updated based on said presentation status.

8. The presentation plan creation apparatus according to claim 1, wherein said program further performs, when executed by the processor, a process of selecting, in response to user input, at least one output device from said plurality of output devices installed in said moving object, wherein said presentation plan is created so that only said selected at least one output device is determined as said selected device.

9. The presentation plan creation apparatus according to claim 1, wherein said presentation item includes information on said destination or facility information around said path.

10. The presentation plan creation apparatus according to claim 1, wherein said presentation item includes weather information, news information, or event information.

11. An information presentation apparatus for presenting information via an output device based on a presentation plan created by the presentation plan creation apparatus according to claim 1, wherein presentation data relating to said presentation item included in said presentation plan is received from an external server at a timing based on a communication band.

12. An information presentation apparatus for presenting information via said selected device based on a presentation plan created by the presentation plan creation apparatus according to claim 1, wherein presentation data relating to said presentation item included in said presentation plan is processed in accordance with said selected device at a timing based on a calculated resource of said information presentation apparatus.

13. A presentation plan creation method of creating a presentation plan of a presentation item presented by a plurality of output devices installed in a moving object, the presentation plan creation method comprising:

setting a path of said moving object to a destination;

dividing said path into divided paths in accordance with a road type;

predicting a driving behavior proportion for each of said divided paths, the driving behavior proportion being a proportion of a total time of performing each of a plurality of driving behaviors in a time of traveling on the divided path;

acquiring device leeway data indicating, for each of combinations of said output devices and said driving behaviors, leeway representing the amount of information capable of being presented by said output devices;

acquiring presentation item data indicating required leeway and a required viewing time, the required leeway being said leeway of each of said output devices required to present said presentation item, the required viewing time being a time required to view said presentation item; and creating a presentation plan in which a selected device and a selected path are determined in line with a selection condition, the selected device being a device to present said presentation item and being selected from said output devices, the selected path being a path on which said moving object travels when said selected device presents said presentation item and being selected from said divided paths, wherein said selection condition is that a time of performing, on said selected path, any of said driving behaviors that allows said leeway of said selected device to be equal to or greater than said required leeway required to present said presentation item is equal to or longer than said required viewing time required to view said presentation item.

* * * * *